(12) United States Patent
Gargiulo

(10) Patent No.: US 8,738,464 B2
(45) Date of Patent: May 27, 2014

(54) METHOD, MEDIUM, AND SYSTEM FOR ONLINE SELECTION AND ORDERING OF CUSTOM FURNITURE

(75) Inventor: Shawn Gargiulo, Lincoln, RI (US)

(73) Assignee: Furnésh, Inc., Marblehead, MA (US)

( * ) Notice: Subject to any disclaimer, the term of this patent is extended or adjusted under 35 U.S.C. 154(b) by 176 days.

(21) Appl. No.: 13/295,674

(22) Filed: Nov. 14, 2011

(65) Prior Publication Data
US 2012/0123897 A1 May 17, 2012

Related U.S. Application Data

(60) Provisional application No. 61/412,498, filed on Nov. 11, 2010.

(51) Int. Cl.
*G06Q 30/00* (2012.01)

(52) U.S. Cl.
USPC .......................................................... 705/26.5

(58) Field of Classification Search
USPC ...................... 705/26.5, 26.1, 27.1
See application file for complete search history.

(56) References Cited

U.S. PATENT DOCUMENTS

| | | | |
|---|---|---|---|
| 5,486,042 A | 1/1996 | Heisler et al. | |
| 5,511,348 A | 4/1996 | Cornell et al. | |
| 5,724,778 A | 3/1998 | Cornell et al. | |
| 5,899,025 A | 5/1999 | Casey et al. | |
| 6,003,275 A | 12/1999 | Cornell et al. | |
| 6,152,553 A | 11/2000 | Wunderlich | |
| 6,170,200 B1 | 1/2001 | Cornell et al. | |
| 6,364,416 B1 | 4/2002 | Rheault et al. | |
| 6,629,386 B1 | 10/2003 | Cornell et al. | |
| 6,877,824 B2 | 4/2005 | Winkless | |
| 6,922,949 B2 | 8/2005 | Cornell et al. | |
| 7,437,306 B1 | 10/2008 | Bayer et al. | |
| 7,461,774 B2 | 12/2008 | Vergara et al. | |
| 7,542,925 B2 | 6/2009 | Tung | |
| 7,748,622 B2 | 7/2010 | Schon et al. | |
| 2003/0200704 A1 | 10/2003 | Cornell et al. | |
| 2005/0027553 A1* | 2/2005 | Samet | 705/1 |
| 2006/0238085 A1 | 10/2006 | Greenberg | |
| 2006/0277119 A1 | 12/2006 | Tung | |
| 2007/0203609 A1 | 8/2007 | DeCastro | |
| 2008/0313055 A1 | 12/2008 | Stinson et al. | |
| 2009/0021128 A1 | 1/2009 | Greenberg | |
| 2009/0076932 A1 | 3/2009 | Tung | |
| 2009/0193578 A1 | 8/2009 | Jang et al. | |

OTHER PUBLICATIONS

Apr. 2008—http://upholsteredfurniture.blogspot.com/2008/04/how-to-measure-and-calculate-repeats.html.*

* cited by examiner

*Primary Examiner* — Matthew Zimmerman
(74) *Attorney, Agent, or Firm* — Lambert & Associates; Gary E. Lambert; David J. Connaugton, Jr.

(57) ABSTRACT

The present invention relates to methods and computer systems for ordering customized furniture pieces to be upholstered and an upholstery covering. In particular, the methods of the present invention relate to calculating the amount of a covering needed based on the fabric repeat size in the case of a fabric covering, or based on hide inconsistencies in the case of a leather covering.

16 Claims, 30 Drawing Sheets

Order Flow Sequence Diagram – Selection of Furniture + Upholstery Separately
2 Step Process for Selection of Upholstered Furniture - 1st Step Selection of Piece of Furniture - 2nd Step Selection of Upholstery for Piece of Furniture

| Order Process Phases Customer Action | Website Actions Website Front end (what is visible) | Website Structures Website Back end (what is happening behind the scenes) |
|---|---|---|
| 1. Furniture Selection | | |
| 1A Select Product Type | Display groups of products (furniture) within pre-determined types based on customer selection. | Quarry product database and stored images. Carry data of customer's product type selection. |
| 1B Select Product | Display specific product based on customer selection. Display the COM and COL prices and finish options for the piece of furniture. | Quarry product database and stored images. Carry data of customer's product item selection. |
| 1C Select Finish Options/Upholstery Type options, | Allow customer to select the finish options and the upholstery types of either fabric or leather for the piece of furniture. Then allow customer to initiate upholstery selection step of the process. | Quarry product database and stored images. Carry data of customer's product item, finish and upholstery type selection. |
| 2. Upholstery Selection | | |
| 2A Select Upholstery Pattern | Display upholstery patterns available for the piece of furniture. Display the amount of upholstery required for the piece of furniture. For fabrics, display amount required as a range to account. | Quarry product database and stored images. Carry data of customer's product and finish selections. Quarry database for upholstery available for selected piece of furniture within the type selected by the customer. |
| | for repeats in the fabric pattern(s). | Calculate amount of upholstery required based on product requirements and repeats in fabric pattern. Round up to whole numbers since fabric is only sold whole yards and leather is whole square feet. |
| 2B Select Upholstery Pattern Color amounts. | Display colors available for the selected upholstery pattern. Allow customer to choose preferred color. | Quarry product database and stored images. Carry data of customer's product and finish selections and upholstery pattern and color selections and |
| 3 Checkout data). | Display selected piece of furniture with price, selected pattern and color of upholstery with amount and price, and overall price of both. | Calculate the pricing for selected products (carried |
| 4 Post Order/Acknowledgement manufacturer, and | Provide leadtime information to customer for both furniture and upholstery. | Issue purchase order to upholstery order upholstery (to be shipped to furniture manufacturer). Issue purchase order to furniture manufacturer and order furniture piece (to be shipped to customer). |

Fig. 1A

| | A | B | C | D | E | F | G | H | I | J |
|---|---|---|---|---|---|---|---|---|---|---|
| 1 | store | websites | attribute_ | config_attributes | type | sku | category_ids | has_options | name | url_key |
| 2 | admin | base | Leathers | | simple | BH_3100-001 | 91, 92 | 0 | Finesse 3100-001 | BH_3100-001 |
| 3 | admin | base | Leathers | | simple | BH_3100-003 | 91, 92 | 0 | Finesse 3100-003 | BH_3100-003 |
| 4 | admin | base | Leathers | | simple | BH_3100-004 | 91, 92 | 0 | Finesse 3100-004 | BH_3100-004 |
| 5 | admin | base | Leathers | | simple | BH_3100-005 | 91, 92 | 0 | Finesse 3100-005 | BH_3100-005 |
| 6 | admin | base | Leathers | | simple | BH_3100-020 | 91, 92 | 0 | Finesse 3100-020 | BH_3100-020 |
| 7 | admin | base | Leathers | | simple | BH_3100-025 | 91, 92 | 0 | Finesse 3100-025 | BH_3100-025 |
| 8 | admin | base | Leathers | | simple | BH_3100-041 | 91, 92 | 0 | Finesse 3100-041 | BH_3100-041 |
| 9 | admin | base | Leathers | | simple | BH_3100-044 | 91, 92 | 0 | Finesse 3100-044 | BH_3100-044 |
| 10 | admin | base | Leathers | | simple | BH_3100-050 | 91, 92 | 0 | Finesse 3100-050 | BH_3100-050 |
| 11 | admin | base | Leathers | | simple | BH_3100-055 | 91, 92 | 0 | Finesse 3100-055 | BH_3100-055 |
| 12 | admin | base | Leathers | | simple | BH_3100-110 | 91, 92 | 0 | Finesse 3100-110 | BH_3100-110 |
| 13 | admin | base | Leathers | | simple | BH_3100-122 | 91, 92 | 0 | Finesse 3100-122 | BH_3100-122 |
| 14 | admin | base | Leathers | Color | configurable | BH_3100 | 91, 92 | 1 | Finesse 3100 | BH_3100 |
| 15 | admin | base | Leathers | | simple | BH_3105-000 | 91, 92 | 0 | Fundamental 3105-000 | BH_3105-000 |
| 16 | admin | base | Leathers | | simple | BH_3105-001 | 91, 92 | 0 | Fundamental 3105-001 | BH_3105-001 |
| 17 | admin | base | Leathers | | simple | BH_3105-002 | 91, 92 | 0 | Fundamental 3105-002 | BH_3105-002 |
| 18 | admin | base | Leathers | | simple | BH_3105-014 | 91, 92 | 0 | Fundamental 3105-014 | BH_3105-014 |
| 19 | admin | base | Leathers | | simple | BH_3105-020 | 91, 92 | 0 | Fundamental 3105-020 | BH_3105-020 |
| 20 | admin | base | Leathers | | simple | BH_3105-026 | 91, 92 | 0 | Fundamental 3105-026 | BH_3105-026 |
| 21 | admin | base | Leathers | | simple | BH_3105-055 | 91, 92 | 0 | Fundamental 3105-055 | BH_3105-055 |
| 22 | admin | base | Leathers | | simple | BH_3105-100 | 91, 92 | 0 | Fundamental 3105-100 | BH_3105-100 |
| 23 | admin | base | Leathers | | simple | BH_3105-122 | 91, 92 | 0 | Fundamental 3105-122 | BH_3105-122 |
| 24 | admin | base | Leathers | | simple | BH_3105-144 | 91, 92 | 0 | Fundamental 3105-144 | BH_3105-144 |
| 25 | admin | base | Leathers | Color | configurable | BH_3105 | 91, 92 | 1 | Fundamental 3105 | BH_3105 |
| 26 | admin | base | Textiles | | simple | BH_3377-900 | 83, 84 | 0 | Bark 3377-900 | BH_3377-900 |
| 27 | admin | base | Textiles | | simple | BH_3377-912 | 83, 84 | 0 | Bark 3377-912 | BH_3377-912 |
| 28 | admin | base | Textiles | | simple | BH_3377-922 | 83, 84 | 0 | Bark 3377-922 | BH_3377-922 |
| 29 | admin | base | Textiles | | simple | BH_3377-925 | 83, 84 | 0 | Bark 3377-925 | BH_3377-925 |
| 30 | admin | base | Textiles | | simple | BH_3377-933 | 83, 84 | 0 | Bark 3377-933 | BH_3377-933 |
| 31 | admin | base | Textiles | | simple | BH_3377-934 | 83, 84 | 0 | Bark 3377-934 | BH_3377-934 |
| 32 | admin | base | Textiles | | simple | BH_3377-944 | 83, 84 | 0 | Bark 3377-944 | BH_3377-944 |
| 33 | admin | base | Textiles | | simple | BH_3377-966 | 83, 84 | 0 | Bark 3377-966 | BH_3377-966 |
| 34 | admin | base | Textiles | | simple | BH_3377-977 | 83, 84 | 0 | Bark 3377-977 | BH_3377-977 |
| 35 | admin | base | Textiles | Color | configurable | BH_3377 | 83, 84 | 1 | Bark 3377 | BH_3377 |
| 36 | admin | base | Textiles | | simple | BH_3346-002 | 83, 84 | 0 | Asteroids 3346-002 | BH_3346-002 |
| 37 | admin | base | Textiles | | simple | BH_3346-003 | 83, 84 | 0 | Asteroids 3346-003 | BH_3346-003 |
| 38 | admin | base | Textiles | | simple | BH_3346-005 | 83, 84 | 0 | Asteroids 3346-005 | BH_3346-005 |
| 39 | admin | base | Textiles | | simple | BH_3346-022 | 83, 84 | 0 | Asteroids 3346-022 | BH_3346-022 |
| 40 | admin | base | Textiles | | simple | BH_3346-033 | 83, 84 | 0 | Asteroids 3346-033 | BH_3346-033 |
| 41 | admin | base | Textiles | | simple | BH_3346-077 | 83, 84 | 0 | Asteroids 3346-077 | BH_3346-077 |
| 42 | admin | base | Textiles | Color | configurable | BH_3346 | 83, 84 | 1 | Asteroids 3346 | BH_3346 |
| 43 | admin | base | Furniture | | simple | BH_1612-L | 10, 35, 36 | 0 | Affiliate 1612 | BH_1612-L |

Fig. 1B

| | A | B | C | D | E | F | G | H | I | J |
|---|---|---|---|---|---|---|---|---|---|---|
| 44 | admin | base | Furniture | | simple | BH_1612-F | 10, 35, 36 | 0 | Affiliate 1612 | BH_1612-F |
| 45 | admin | base | Furniture | furniture_covering | configurable | BH_1612 | 10, 35, 36 | 1 | Affiliate 1612 | BH_1612 |
| 46 | admin | base | Furniture | | simple | BH_B21 | 10, 44, 49 | 1 | B.5 Baron B21 | BH_B21 |
| 47 | admin | base | Furniture | | simple | BH_B26 | 10, 44, 49 | 1 | B.5 Baron B26 | BH_B26 |
| 48 | admin | base | Furniture | | simple | BH_B42 | 10, 44, 46 | 0 | B.5 Baron B42 | BH_B42 |
| 49 | admin | base | Furniture | | simple | BH_1516-L | 10, 35, 36 | 0 | B.4 Baron 1516 | BH_1516-L |
| 50 | admin | base | Furniture | | simple | BH_1516-F | 10, 35, 36 | 1 | B.4 Baron 1516 | BH_1516-F |
| 51 | admin | base | Furniture | furniture_covering | configurable | BH_1516 | 10, 35, 36 | 0 | B.4 Baron 1516 | BH_1516 |
| 52 | admin | base | Furniture | | simple | BH_4302AS-L | 10, 35, 38 | 0 | B.1 Baron 4302A | BH_4302AS-L |
| 53 | admin | base | Furniture | | simple | BH_4302AS-F | 10, 35, 38 | 1 | B.1 Baron 4302A | BH_4302AS-F |
| 54 | admin | base | Furniture | furniture_covering | configurable | BH_4302AS | 10, 35, 38 | 0 | B.1 Baron 4302A | BH_4302AS |
| 55 | admin | base | Furniture | | simple | BH_4302BS-L | 10, 35, 38 | 0 | B.1 Baron 4302B | BH_4302BS-L |
| 56 | admin | base | Furniture | | simple | BH_4302BS-F | 10, 35, 38 | 1 | B.1 Baron 4302B | BH_4302BS-F |
| 57 | admin | base | Furniture | furniture_covering | configurable | BH_4302BS | 10, 35, 38 | 0 | B.1 Baron 4302B | BH_4302BS |
| 58 | admin | base | Furniture | | simple | BH_4337AS-L | 10, 35, 39 | 0 | B.1 Baron 4337A | BH_4337AS-L |
| 59 | admin | base | Furniture | | simple | BH_4337AS-F | 10, 35, 39 | 1 | B.1 Baron 4337A | BH_4337AS-F |
| 60 | admin | base | Furniture | furniture_covering | configurable | BH_4337AS | 10, 35, 39 | 0 | B.1 Baron 4337A | BH_4337AS |
| 61 | admin | base | Furniture | | simple | BH_4337BS-L | 10, 35, 39 | 0 | B.1 Baron 4337B | BH_4337BS-L |
| 62 | admin | base | Furniture | | simple | BH_4337BS-F | 10, 35, 39 | 1 | B.1 Baron 4337B | BH_4337BS-F |
| 63 | admin | base | Furniture | furniture_covering | configurable | BH_4337BS | 10, 35, 39 | 0 | B.1 Baron 4337B | BH_4337BS |
| 64 | admin | base | Furniture | | simple | BH_1522-L | 10, 35, 42 | 0 | Aro 1522 | BH_1522-L |
| 65 | admin | base | Furniture | | simple | BH_1522-F | 10, 35, 42 | 1 | Aro 1522 | BH_1522-F |
| 66 | admin | base | Furniture | furniture_covering | configurable | BH_1522 | 10, 35, 42 | 1 | Aro 1522 | BH_1522 |
| 67 | admin | base | Furniture | | simple | BH_1523-L | 10, 35, 42 | 0 | Aro 1523 | BH_1523-L |
| 68 | admin | base | Furniture | furniture_covering | configurable | BH_1523-F | 10, 35, 42 | 1 | Aro 1523 | BH_1523-F |
| 69 | admin | base | Furniture | | simple | BH_1523 | 10, 35, 42 | 1 | Aro 1523 | BH_1523 |
| 70 | admin | base | Furniture | | simple | BH_1521 | 10, 35, 42 | 1 | Aro 1521 | BH_1521 |
| 71 | admin | base | Furniture | | simple | BH_1520 | 10, 35, 42 | 1 | Aro 1520 | BH_1520 |
| 72 | admin | base | Furniture | | simple | BH_2518-L | 10, 35, 37 | 0 | Cycle 2518 | BH_2518-L |
| 73 | admin | base | Furniture | | simple | BH_2518-F | 10, 35, 37 | 1 | Cycle 2518 | BH_2518-F |
| 74 | admin | base | Furniture | furniture_covering | configurable | BH_2518 | 10, 35, 37 | 0 | Cycle 2518 | BH_2518 |
| 75 | admin | base | Furniture | | simple | BH_2536-L | 10, 35, 37 | 0 | Cycle 2536 | BH_2536-L |
| 76 | admin | base | Furniture | | simple | BH_2536-F | 10, 35, 37 | 1 | Cycle 2536 | BH_2536-F |
| 77 | admin | base | Furniture | furniture_covering | configurable | BH_2536 | 10, 35, 37 | 0 | Cycle 2536 | BH_2536 |
| 78 | admin | base | Furniture | | simple | BH_1125 | 10, 35, 36, 69, | 1 | Coast 1125 | BH_1125 |

Fig. 1C

| | K | L | M | N | O | P |
|---|---|---|---|---|---|---|
| 1 | gift_message_available | meta_title | meta_description | thumbnail | small_image | image |
| 2 | Use config | BH_3100-001 | Finesse Leather | /bh_finesse_3100-001s.jpg | /bh_finesse_3100-001s.jpg | /bh_finesse_3100-001s.jpg |
| 3 | Use config | BH_3100-003 | Finesse Leather | /bh_finesse_3100-003s.jpg | /bh_finesse_3100-003s.jpg | /bh_finesse_3100-003s.jpg |
| 4 | Use config | BH_3100-004 | Finesse Leather | /bh_finesse_3100-004s.jpg | /bh_finesse_3100-004s.jpg | /bh_finesse_3100-004s.jpg |
| 5 | Use config | BH_3100-005 | Finesse Leather | /bh_finesse_3100-005s.jpg | /bh_finesse_3100-005s.jpg | /bh_finesse_3100-005s.jpg |
| 6 | Use config | BH_3100-020 | Finesse Leather | /bh_finesse_3100-020s.jpg | /bh_finesse_3100-020s.jpg | /bh_finesse_3100-020s.jpg |
| 7 | Use config | BH_3100-025 | Finesse Leather | /bh_finesse_3100-025s.jpg | /bh_finesse_3100-025s.jpg | /bh_finesse_3100-025s.jpg |
| 8 | Use config | BH_3100-041 | Finesse Leather | /bh_finesse_3100-041s.jpg | /bh_finesse_3100-041s.jpg | /bh_finesse_3100-041s.jpg |
| 9 | Use config | BH_3100-044 | Finesse Leather | /bh_finesse_3100-044s.jpg | /bh_finesse_3100-044s.jpg | /bh_finesse_3100-044s.jpg |
| 10 | Use config | BH_3100-050 | Finesse Leather | /bh_finesse_3100-050s.jpg | /bh_finesse_3100-050s.jpg | /bh_finesse_3100-050s.jpg |
| 11 | Use config | BH_3100-055 | Finesse Leather | /bh_finesse_3100-055s.jpg | /bh_finesse_3100-055s.jpg | /bh_finesse_3100-055s.jpg |
| 12 | Use config | BH_3100-110 | Finesse Leather | /bh_finesse_3100-110s.jpg | /bh_finesse_3100-110s.jpg | /bh_finesse_3100-110s.jpg |
| 13 | Use config | BH_3100-122 | Finesse Leather | /bh_finesse_3100-122s.jpg | /bh_finesse_3100-122s.jpg | /bh_finesse_3100-122s.jpg |
| 14 | Use config | BH_3100 | Finesse Leather | /bh_finesse_3100-001s.jpg | /bh_finesse_3100-001s.jpg | /bh_finesse_3100-001s.jpg |
| 15 | Use config | BH_3105-000 | Fundamental Leather | /bh_fundamental_3105-000s.jpg | /bh_fundamental_3105-000s.jpg | /bh_fundamental_3105-000s.jpg |
| 16 | Use config | BH_3105-001 | Fundamental Leather | /bh_fundamental_3105-001s.jpg | /bh_fundamental_3105-001s.jpg | /bh_fundamental_3105-001s.jpg |
| 17 | Use config | BH_3105-002 | Fundamental Leather | /bh_fundamental_3105-002s.jpg | /bh_fundamental_3105-002s.jpg | /bh_fundamental_3105-002s.jpg |
| 18 | Use config | BH_3105-014 | Fundamental Leather | /bh_fundamental_3105-014s.jpg | /bh_fundamental_3105-014s.jpg | /bh_fundamental_3105-014s.jpg |
| 19 | Use config | BH_3105-020 | Fundamental Leather | /bh_fundamental_3105-020s.jpg | /bh_fundamental_3105-020s.jpg | /bh_fundamental_3105-020s.jpg |
| 20 | Use config | BH_3105-026 | Fundamental Leather | /bh_fundamental_3105-026s.jpg | /bh_fundamental_3105-026s.jpg | /bh_fundamental_3105-026s.jpg |
| 21 | Use config | BH_3105-055 | Fundamental Leather | /bh_fundamental_3105-055s.jpg | /bh_fundamental_3105-055s.jpg | /bh_fundamental_3105-055s.jpg |
| 22 | Use config | BH_3105-100 | Fundamental Leather | /bh_fundamental_3105-100s.jpg | /bh_fundamental_3105-100s.jpg | /bh_fundamental_3105-100s.jpg |
| 23 | Use config | BH_3105-122 | Fundamental Leather | /bh_fundamental_3105-122s.jpg | /bh_fundamental_3105-122s.jpg | /bh_fundamental_3105-122s.jpg |
| 24 | Use config | BH_3105-144 | Fundamental Leather | /bh_fundamental_3105-144s.jpg | /bh_fundamental_3105-144s.jpg | /bh_fundamental_3105-144s.jpg |
| 25 | Use config | BH_3105 | Fundamentals Leather | /bh_fundamental_3105-001s.jpg | /bh_fundamental_3105-001s.jpg | /bh_fundamental_3105-001s.jpg |
| 26 | Use config | BH_3377-900 | Bark Fabric | /bh_bark_3377-900l.jpg | /bh_bark_3377-900l.jpg | /bh_bark_3377-900l.jpg |
| 27 | Use config | BH_3377-912 | Bark Fabric | /bh_bark_3377-912l.jpg | /bh_bark_3377-912l.jpg | /bh_bark_3377-912l.jpg |
| 28 | Use config | BH_3377-922 | Bark Fabric | /bh_bark_3377-922l.jpg | /bh_bark_3377-922l.jpg | /bh_bark_3377-922l.jpg |
| 29 | Use config | BH_3377-925 | Bark Fabric | /bh_bark_3377-925l.jpg | /bh_bark_3377-925l.jpg | /bh_bark_3377-925l.jpg |
| 30 | Use config | BH_3377-933 | Bark Fabric | /bh_bark_3377-933l.jpg | /bh_bark_3377-933l.jpg | /bh_bark_3377-933l.jpg |
| 31 | Use config | BH_3377-934 | Bark Fabric | /bh_bark_3377-934l.jpg | /bh_bark_3377-934l.jpg | /bh_bark_3377-934l.jpg |
| 32 | Use config | BH_3377-944 | Bark Fabric | /bh_bark_3377-944l.jpg | /bh_bark_3377-944l.jpg | /bh_bark_3377-944l.jpg |
| 33 | Use config | BH_3377-966 | Bark Fabric | /bh_bark_3377-966l.jpg | /bh_bark_3377-966l.jpg | /bh_bark_3377-966l.jpg |
| 34 | Use config | BH_3377-977 | Bark Fabric | /bh_bark_3377-977l.jpg | /bh_bark_3377-977l.jpg | /bh_bark_3377-977l.jpg |
| 35 | Use config | BH_3377 | Bark Fabric | /bh_bark_3377-900l.jpg | /bh_bark_3377-900l.jpg | /bh_bark_3377-900l.jpg |
| 36 | Use config | BH_3346-002 | Asteroids Fabric | /bh_asteroids_3346-002l.jpg | /bh_asteroids_3346-002l.jpg | /bh_asteroids_3346-002l.jpg |
| 37 | Use config | BH_3346-003 | Asteroids Fabric | /bh_asteroids_3346-003l.jpg | /bh_asteroids_3346-003l.jpg | /bh_asteroids_3346-003l.jpg |
| 38 | Use config | BH_3346-005 | Asteroids Fabric | /bh_asteroids_3346-005l.jpg | /bh_asteroids_3346-005l.jpg | /bh_asteroids_3346-005l.jpg |
| 39 | Use config | BH_3346-022 | Asteroids Fabric | /bh_asteroids_3346-022l.jpg | /bh_asteroids_3346-022l.jpg | /bh_asteroids_3346-022l.jpg |
| 40 | Use config | BH_3346-033 | Asteroids Fabric | /bh_asteroids_3346-033l.jpg | /bh_asteroids_3346-033l.jpg | /bh_asteroids_3346-033l.jpg |
| 41 | Use config | BH_3346-077 | Asteroids Fabric | /bh_asteroids_3346-077l.jpg | /bh_asteroids_3346-077l.jpg | /bh_asteroids_3346-077l.jpg |
| 42 | Use config | BH_3346 | Asteroids Fabric | /bh_asteroids_3346-002l.jpg | /bh_asteroids_3346-002l.jpg | /bh_asteroids_3346-002l.jpg |
| 43 | Use config | BH_1612-L | Affiliate 1612 Guest Chair | /bh_affiliate_1612.jpg | /bh_affiliate_1612.jpg | /bh_affiliate_1612.jpg |

Fig. 1D

| | K | L | M | N | O | P |
|---|---|---|---|---|---|---|
| 44 | Use config | BH_1612-F | Affiliate 1612 Guest Chair | /bh_affiliate_1612.jpg | /bh_affiliate_1612.jpg | /bh_affiliate_1612.jpg |
| 45 | Use config | BH_1612 | Affiliate 1612 Guest Chair | /bh_affiliate_1612.jpg | /bh_affiliate_1612.jpg | /bh_affiliate_1612.jpg |
| 46 | Use config | BH_B21 | B5 B21 Occasional Table | /bh_b5_b21.jpg | /bh_b5_b21.jpg | /bh_b5_b21.jpg |
| 47 | Use config | BH_B26 | B5 B26 Occasional Table | /bh_b5_b26.jpg | /bh_b5_b26.jpg | /bh_b5_b26.jpg |
| 48 | Use config | BH_B42 | B5 B42 Occasional Table | /bh_b5_b42.jpg | /bh_b5_b42.jpg | /bh_b5_b42.jpg |
| 49 | Use config | BH_1516-L | b.4 1516 Guest Chair | /bh_b4-baron_1516.jpg | /bh_b4-baron_1516.jpg | /bh_b4-baron_1516.jpg |
| 50 | Use config | BH_1516-F | b.4 1516 Guest Chair | /bh_b4-baron_1516.jpg | /bh_b4-baron_1516.jpg | /bh_b4-baron_1516.jpg |
| 51 | Use config | BH_1516 | b.4 1516 Guest Chair | /bh_b4-baron_1516.jpg | /bh_b4-baron_1516.jpg | /bh_b4-baron_1516.jpg |
| 52 | Use config | BH_4302AS-L | b.1 Baron 4302AS Lounge | /bh_b1-baron_4302as.jpg | /bh_b1-baron_4302as.jpg | /bh_b1-baron_4302as.jpg |
| 53 | Use config | BH_4302AS-F | b.1 Baron 4302AS Lounge | /bh_b1-baron_4302as.jpg | /bh_b1-baron_4302as.jpg | /bh_b1-baron_4302as.jpg |
| 54 | Use config | BH_4302AS | b.1 Baron 4302AS Lounge | /bh_b1-baron_4302as.jpg | /bh_b1-baron_4302as.jpg | /bh_b1-baron_4302as.jpg |
| 55 | Use config | BH_4302BS-L | b.1 Baron 4302BS Lounge | /bh_b1-baron_4302bs.jpg | /bh_b1-baron_4302bs.jpg | /bh_b1-baron_4302bs.jpg |
| 56 | Use config | BH_4302BS-F | b.1 Baron 4302BS Lounge | /bh_b1-baron_4302bs.jpg | /bh_b1-baron_4302bs.jpg | /bh_b1-baron_4302bs.jpg |
| 57 | Use config | BH_4302BS | b.1 Baron 4302BS Lounge | /bh_b1-baron_4302bs.jpg | /bh_b1-baron_4302bs.jpg | /bh_b1-baron_4302bs.jpg |
| 58 | Use config | BH_4337AS-L | b.1 Baron 4337AS 3Seat Sofa | /bh_b1-baron_4337as.jpg | /bh_b1-baron_4337as.jpg | /bh_b1-baron_4337as.jpg |
| 59 | Use config | BH_4337AS-F | b.1 Baron 4337AS 3Seat Sofa | /bh_b1-baron_4337as.jpg | /bh_b1-baron_4337as.jpg | /bh_b1-baron_4337as.jpg |
| 60 | Use config | BH_4337AS | b.1 Baron 4337AS 3Seat Sofa | /bh_b1-baron_4337as.jpg | /bh_b1-baron_4337as.jpg | /bh_b1-baron_4337as.jpg |
| 61 | Use config | BH_4337BS-L | b.1 Baron 4337BS 3Seat Sofa | /bh_b1-baron_4337bs.jpg | /bh_b1-baron_4337bs.jpg | /bh_b1-baron_4337bs.jpg |
| 62 | Use config | BH_4337BS-F | b.1 Baron 4337BS 3Seat Sofa | /bh_b1-baron_4337bs.jpg | /bh_b1-baron_4337bs.jpg | /bh_b1-baron_4337bs.jpg |
| 63 | Use config | BH_4337BS | b.1 Baron 4337BS 3Seat Sofa | /bh_b1-baron_4337bs.jpg | /bh_b1-baron_4337bs.jpg | /bh_b1-baron_4337bs.jpg |
| 64 | Use config | BH_1522-L | Aro 1522 Bar Stool | /bh_aro_1522.jpg | /bh_aro_1522.jpg | /bh_aro_1522.jpg |
| 65 | Use config | BH_1522-F | Aro 1522 Bar Stool | /bh_aro_1522.jpg | /bh_aro_1522.jpg | /bh_aro_1522.jpg |
| 66 | Use config | BH_1522 | Aro 1522 Bar Stool | /bh_aro_1522.jpg | /bh_aro_1522.jpg | /bh_aro_1522.jpg |
| 67 | Use config | BH_1523-L | Aro 1523 Bar Stool | /bh_aro_1523.jpg | /bh_aro_1523.jpg | /bh_aro_1523.jpg |
| 68 | Use config | BH_1523-F | Aro 1523 Bar Stool | /bh_aro_1523.jpg | /bh_aro_1523.jpg | /bh_aro_1523.jpg |
| 69 | Use config | BH_1523 | Aro 1523 Bar Stool | /bh_aro_1523.jpg | /bh_aro_1523.jpg | /bh_aro_1523.jpg |
| 70 | Use config | BH_1521 | Aro 1521 Bar Stool | /bh_aro_1521.jpg | /bh_aro_1521.jpg | /bh_aro_1521.jpg |
| 71 | Use config | BH_1520 | Aro 1520 Bar Stool | /bh_aro_1520.jpg | /bh_aro_1520.jpg | /bh_aro_1520.jpg |
| 72 | Use config | BH_2518-L | Cycle 2518 Bench | /bh_cycle_2518.jpg | /bh_cycle_2518.jpg | /bh_cycle_2518.jpg |
| 73 | Use config | BH_2518-F | Cycle 2518 Bench | /bh_cycle_2518.jpg | /bh_cycle_2518.jpg | /bh_cycle_2518.jpg |
| 74 | Use config | BH_2518 | Cycle 2518 Bench | /bh_cycle_2518.jpg | /bh_cycle_2518.jpg | /bh_cycle_2518.jpg |
| 75 | Use config | BH_2536-L | Cycle 2536 Bench | /bh_cycle_2536.jpg | /bh_cycle_2536.jpg | /bh_cycle_2536.jpg |
| 76 | Use config | BH_2536-F | Cycle 2536 Bench | /bh_cycle_2536.jpg | /bh_cycle_2536.jpg | /bh_cycle_2536.jpg |
| 77 | Use config | BH_2536 | Cycle 2536 Bench | /bh_cycle_2536.jpg | /bh_cycle_2536.jpg | /bh_cycle_2536.jpg |
| 78 | Use config | BH_1125 | Coast 1125 Chair | /bh_coast_1125.jpg | /bh_coast_1125.jpg | /bh_coast_1125.jpg |

Fig. 1E

| | Q | R | S | T | U | V | W | X |
|---|---|---|---|---|---|---|---|---|
| | custom_design | options_container | leather_origin | url_path | fabric_dimensions | warranty_period | weight | price |
| 1 | | | | | | | | |
| 2 | | Block after Info Column | SC, USA | BH_3100-001.html | | 3 Year | | 9.75 |
| 3 | | Block after Info Column | SC, USA | BH_3100-003.html | | 3 Year | | 9.75 |
| 4 | | Block after Info Column | SC, USA | BH_3100-004.html | | 3 Year | | 9.75 |
| 5 | | Block after Info Column | SC, USA | BH_3100-005.html | | 3 Year | | 9.75 |
| 6 | | Block after Info Column | SC, USA | BH_3100-020.html | | 3 Year | | 9.75 |
| 7 | | Block after Info Column | SC, USA | BH_3100-025.html | | 3 Year | | 9.75 |
| 8 | | Block after Info Column | SC, USA | BH_3100-041.html | | 3 Year | | 9.75 |
| 9 | | Block after Info Column | SC, USA | BH_3100-044.html | | 3 Year | | 9.75 |
| 10 | | Block after Info Column | SC, USA | BH_3100-050.html | | 3 Year | | 9.75 |
| 11 | | Block after Info Column | SC, USA | BH_3100-055.html | | 3 Year | | 9.75 |
| 12 | | Block after Info Column | SC, USA | BH_3100-110.html | | 3 Year | | 9.75 |
| 13 | | Block after Info Column | SC, USA | BH_3100-122.html | | 3 Year | | 9.75 |
| 14 | | Block after Info Column | SC, USA | BH_3100.html | | 3 Year | | 9.75 |
| 15 | | Block after Info Column | SC, USA | BH_3105-000.html | | 3 Year | | 7.25 |
| 16 | | Block after Info Column | SC, USA | BH_3105-001.html | | 3 Year | | 7.25 |
| 17 | | Block after Info Column | SC, USA | BH_3105-002.html | | 3 Year | | 7.25 |
| 18 | | Block after Info Column | SC, USA | BH_3105-014.html | | 3 Year | | 7.25 |
| 19 | | Block after Info Column | SC, USA | BH_3105-020.html | | 3 Year | | 7.25 |
| 20 | | Block after Info Column | SC, USA | BH_3105-026.html | | 3 Year | | 7.25 |
| 21 | | Block after Info Column | SC, USA | BH_3105-055.html | | 3 Year | | 7.25 |
| 22 | | Block after Info Column | SC, USA | BH_3105-100.html | | 3 Year | | 7.25 |
| 23 | | Block after Info Column | SC, USA | BH_3105-122.html | | 3 Year | | 7.25 |
| 24 | | Block after Info Column | SC, USA | BH_3105-144.html | | 3 Year | | 7.25 |
| 25 | | Block after Info Column | SC, USA | BH_3105.html | | 3 Year | | 7.25 |
| 26 | | Block after Info Column | | BH_3377_900.html | 54 | 3 Year | 0.7 | 44 |
| 27 | | Block after Info Column | | BH_3377_912.html | 54 | 3 Year | 0.7 | 44 |
| 28 | | Block after Info Column | | BH_3377_922.html | 54 | 3 Year | 0.7 | 44 |
| 29 | | Block after Info Column | | BH_3377-925.html | 54 | 3 Year | 0.7 | 44 |
| 30 | | Block after Info Column | | BH_3377_933.html | 54 | 3 Year | 0.7 | 44 |
| 31 | | Block after Info Column | | BH_3377_934.html | 54 | 3 Year | 0.7 | 44 |
| 32 | | Block after Info Column | | BH_3377_944.html | 54 | 3 Year | 0.7 | 44 |
| 33 | | Block after Info Column | | BH_3377-966.html | 54 | 3 Year | 0.7 | 44 |
| 34 | | Block after Info Column | | BH_3377_977.html | 54 | 3 Year | 0.7 | 44 |
| 35 | | Block after Info Column | | BH_3377.html | 54 | 3 Year | 0.7 | 44 |
| 36 | | Block after Info Column | | BH_3346-002.html | 54 | 3 Year | 0.8 | 62 |
| 37 | | Block after Info Column | | BH_3346-003.html | 54 | 3 Year | 0.8 | 62 |
| 38 | | Block after Info Column | | BH_3346-005.html | 54 | 3 Year | 0.8 | 62 |
| 39 | | Block after Info Column | | BH_3346-022.html | 54 | 3 Year | 0.8 | 62 |
| 40 | | Block after Info Column | | BH_3346-033.html | 54 | 3 Year | 0.8 | 62 |
| 41 | | Block after Info Column | | BH_3346-077.html | 54 | 3 Year | 0.8 | 62 |
| 42 | | Block after Info Column | | BH_3346.html | 54 | 3 Year | 0.8 | 62 |
| 43 | | Block after Info Column | | BH_1612_L.html | | 5 Year | 35 Lbs. | 829 |

Fig. 1F

| | Q | R | S | T | U | V | W | X |
|---|---|---|---|---|---|---|---|---|
| 44 | | Block after Info Column | | BH_1612-F.html | | 5 Year | 35 Lbs. | 829 |
| 45 | | Block after Info Column | | BH_1612.html | | 5 Year | 35 Lbs. | 829 |
| 46 | | Block after Info Column | | BH_B21.html | | 5 Year | 45 Lbs. | 1420 |
| 47 | | Block after Info Column | | BH_B26.html | | 5 Year | 50 Lbs. | 1480 |
| 48 | | Block after Info Column | | BH_B42.html | | 5 Year | 90 Lbs. | 2460 |
| 49 | | Block after Info Column | | BH_1516-L.html | | 5 Year | 37 Lbs. | 1010 |
| 50 | | Block after Info Column | | BH_1516-F.html | | 5 Year | 37 Lbs. | 1010 |
| 51 | | Block after Info Column | | BH_1516.html | | 5 Year | 37 Lbs. | 1010 |
| 52 | | Block after Info Column | | BH_4302AS-L.html | | 5 Year | 75 Lbs. | 1635 |
| 53 | | Block after Info Column | | BH_4302AS-F.html | | 5 Year | 75 Lbs. | 1635 |
| 54 | | Block after Info Column | | BH_4302AS.html | | 5 Year | 75 Lbs. | 1635 |
| 55 | | Block after Info Column | | BH_4302BS-L.html | | 5 Year | 75 Lbs. | 1635 |
| 56 | | Block after Info Column | | BH_4302BS-F.html | | 5 Year | 75 Lbs. | 1635 |
| 57 | | Block after Info Column | | BH_4302BS.html | | 5 Year | 75 Lbs. | 1635 |
| 58 | | Block after Info Column | | BH_4337AS-L.html | | 5 Year | 165 Lbs. | 3745 |
| 59 | | Block after Info Column | | BH_4337AS-F.html | | 5 Year | 165 Lbs. | 3745 |
| 60 | | Block after Info Column | | BH_4337AS.html | | 5 Year | 165 Lbs. | 3745 |
| 61 | | Block after Info Column | | BH_4337BS-L.html | | 5 Year | 165 Lbs. | 3745 |
| 62 | | Block after Info Column | | BH_4337BS-F.html | | 5 Year | 165 Lbs. | 3745 |
| 63 | | Block after Info Column | | BH_4337BS.html | | 5 Year | 165 Lbs. | 3745 |
| 64 | | Block after Info Column | | BH_1522-L.html | | 5 Year | 28 Lbs. | 965 |
| 65 | | Block after Info Column | | BH_1522-F.html | | 5 Year | 28 Lbs. | 965 |
| 66 | | Block after Info Column | | BH_1523-L.html | | 5 Year | 25 Lbs. | 860 |
| 67 | | Block after Info Column | | BH_1523-F.html | | 5 Year | 25 Lbs. | 860 |
| 68 | | Block after Info Column | | BH_1523.html | | 5 Year | 25 Lbs. | 860 |
| 69 | | Block after Info Column | | BH_1521.html | | 5 Year | 25 Lbs. | 965 |
| 70 | | Block after Info Column | | BH_1520.html | | 5 Year | 28 Lbs. | 1072 |
| 71 | | Block after Info Column | | BH_2518-L.html | | 5 Year | 15 Lbs. | 670 |
| 72 | | Block after Info Column | | BH_2518-F.html | | 5 Year | 15 Lbs. | 670 |
| 73 | | Block after Info Column | | BH_2518.html | | 5 Year | 15 Lbs. | 670 |
| 74 | | Block after Info Column | | BH_2536-L.html | | 5 Year | 35 Lbs. | 980 |
| 75 | | Block after Info Column | | BH_2536-F.html | | 5 Year | 35 Lbs. | 980 |
| 76 | | Block after Info Column | | BH_2536.html | | 5 Year | 35 Lbs. | 980 |
| 77 | | Block after Info Column | | BH_1125.html | | 5 Year | 65 Lbs. | 410 |

Fig. 1G

| | description | meta_keyword | short_description | custom_layout_update | sustainability_info | technical_info |
|---|---|---|---|---|---|---|
| 1 | description | meta_keyword | short_description | custom_layout_update | sustainability_info | technical_info |
| 2 | Uncorrected natural full grain leather with slight | | Finesse Leather | | | Finesse 3100-001 |
| 3 | Uncorrected natural full grain leather with slight | | Finesse Leather | | | Finesse 3100-003 |
| 4 | Uncorrected natural full grain leather with slight | | Finesse Leather | | | Finesse 3100-004 |
| 5 | Uncorrected natural full grain leather with slight | | Finesse Leather | | | Finesse 3100-005 |
| 6 | Uncorrected natural full grain leather with slight | | Finesse Leather | | | Finesse 3100-020 |
| 7 | Uncorrected natural full grain leather with slight | | Finesse Leather | | | Finesse 3100-025 |
| 8 | Uncorrected natural full grain leather with slight | | Finesse Leather | | | Finesse 3100-041 |
| 9 | Uncorrected natural full grain leather with slight | | Finesse Leather | | | Finesse 3100-044 |
| 10 | Uncorrected natural full grain leather with slight | | Finesse Leather | | | Finesse 3100-050 |
| 11 | Uncorrected natural full grain leather with slight | | Finesse Leather | | | Finesse 3100-055 |
| 12 | Uncorrected natural full grain leather with slight | | Finesse Leather | | | Finesse 3100-110 |
| 13 | Uncorrected natural full grain leather with slight | | Finesse Leather | | | Finesse 3100-122 |
| 14 | Uncorrected natural full grain leather with slight | | Finesse Leather | | | |
| 15 | Enhanced full grain leather with slight protective | | Fundamental Leather | | | BH_3105-000 |
| 16 | Enhanced full grain leather with slight protective | | Fundamental Leather | | | BH_3105-001 |
| 17 | Enhanced full grain leather with slight protective | | Fundamental Leather | | | BH_3105-002 |
| 18 | Enhanced full grain leather with slight protective | | Fundamental Leather | | | BH_3105-014 |
| 19 | Enhanced full grain leather with slight protective | | Fundamental Leather | | | BH_3105-020 |
| 20 | Enhanced full grain leather with slight protective | | Fundamental Leather | | | BH_3105-026 |
| 21 | Enhanced full grain leather with slight protective | | Fundamental Leather | | | BH_3105-055 |
| 22 | Enhanced full grain leather with slight protective | | Fundamental Leather | | | BH_3105-100 |
| 23 | Enhanced full grain leather with slight protective | | Fundamental Leather | | | BH_3105-122 |
| 24 | Enhanced full grain leather with slight protective | | Fundamental Leather | | | BH_3105-144 |
| 25 | Enhanced full grain leather with slight protective | | Fundamental Leather | | | |
| 26 | Bark is a contemporary textile with a smooth | | Bark Fabric | | | |
| 27 | Bark is a contemporary textile with a smooth | | Bark Fabric | | | |
| 28 | Bark is a contemporary textile with a smooth | | Bark Fabric | | | |
| 29 | Bark is a contemporary textile with a smooth | | Bark Fabric | | | |
| 30 | Bark is a contemporary textile with a smooth | | Bark Fabric | | | |
| 31 | Bark is a contemporary textile with a smooth | | Bark Fabric | | | |
| 32 | Bark is a contemporary textile with a smooth | | Bark Fabric | | | |
| 33 | Bark is a contemporary textile with a smooth | | Bark Fabric | | | |
| 34 | Bark is a contemporary textile with a smooth | | Bark Fabric | | | |
| 35 | Bark is a contemporary textile with a smooth | | Bark Fabric | | | |
| 36 | Asteroids is a contemporary textile with a smooth | | Asteroids Fabric | | | |
| 37 | Asteroids is a contemporary textile with a smooth | | Asteroids Fabric | | | |
| 38 | Asteroids is a contemporary textile with a smooth | | Asteroids Fabric | | | |
| 39 | Asteroids is a contemporary textile with a smooth | | Asteroids Fabric | | | |
| 40 | Asteroids is a contemporary textile with a smooth | | Asteroids Fabric | | | |
| 41 | Asteroids is a contemporary textile with a smooth | | Asteroids Fabric | | | |
| 42 | Asteroids is a contemporary textile with a smooth | | Asteroids Fabric | | | |
| 43 | Upholstered guest chair available w/ maple | | Affiliate 1612 Guest Chair | | GREENGUARD Indoor Air | |

Fig. 1H

| | Y | Z | AA | AB | AC | AD |
|---|---|---|---|---|---|---|
| 44 | Upholstered guest chair available w/ maple | | Affiliate 1612 Guest Chair | | GREENGUARD Indoor Air | |
| 45 | Upholstered guest chair available w/ maple | | Affiliate 1612 Guest Chair | | GREENGUARD Indoor Air | |
| 46 | Square occasional table with 3-ply top with | | B5 B21 Occasional Table | | | |
| 47 | Rectangular occasional table with 3-ply top with | | B5 B26 Occasional Table | | | |
| 48 | Square occasional table with 3-ply top with | | B5 B42 Occasional Table | | | |
| 49 | Guest chair available w/ maple solids, available in | | b.4 1516 Guest Chair | | GREENGUARD Indoor Air | |
| 50 | Guest chair available w/ maple solids, available in | | b.4 1516 Guest Chair | | GREENGUARD Indoor Air | |
| 51 | Guest chair available w/ maple solids, available in | | b.4 1516 Guest Chair | | GREENGUARD Indoor Air | |
| 52 | Fully upholstered lounge chair w/ loosely | | b.1 Baron 4302AS Lounge Chair | | GREENGUARD Indoor Air | |
| 53 | Fully upholstered lounge chair w/ loosely | | b.1 Baron 4302AS Lounge Chair | | GREENGUARD Indoor Air | |
| 54 | Fully upholstered lounge chair w/ loosely | | b.1 Baron 4302AS Lounge Chair | | GREENGUARD Indoor Air | |
| 55 | Fully upholstered lounge chair w/standard HR | | b.1 Baron 4302BS Lounge Chair | | GREENGUARD Indoor Air | |
| 56 | Fully upholstered lounge chair w/standard HR | | b.1 Baron 4302BS Lounge Chair | | GREENGUARD Indoor Air | |
| 57 | Fully upholstered lounge chair w/standard HR | | b.1 Baron 4302BS Lounge Chair | | GREENGUARD Indoor Air | |
| 58 | Fully upholstered 3 seat sofa w/ loosely | | b.1 Baron 4337AS 3Seat Sofa | | GREENGUARD Indoor Air | |
| 59 | Fully upholstered 3 seat sofa w/ loosely | | b.1 Baron 4337AS 3Seat Sofa | | GREENGUARD Indoor Air | |
| 60 | Fully upholstered 3 seat sofa w/ loosely | | b.1 Baron 4337AS 3Seat Sofa | | GREENGUARD Indoor Air | |
| 61 | Fully upholstered 3 seat sofa w/ loosely | | b.1 Baron 4337AS 3Seat Sofa | | GREENGUARD Indoor Air | |
| 62 | Fully upholstered 3 seat sofa w/ loosely | | b.1 Baron 4337AS 3Seat Sofa | | GREENGUARD Indoor Air | |
| 63 | Fully upholstered 3 seat sofa w/ loosely | | b.1 Baron 4337AS 3Seat Sofa | | GREENGUARD Indoor Air | |
| 64 | Bar Stool. Polished stainless steel. Upholstered | | Aro 1522 Bar Stool | | GREENGUARD Indoor Air | |
| 65 | Bar Stool. Polished stainless steel. Upholstered | | Aro 1522 Bar Stool | | GREENGUARD Indoor Air | |
| 66 | Bar Stool. Polished stainless steel. Upholstered | | Aro 1522 Bar Stool | | GREENGUARD Indoor Air | |
| 67 | Counter height stool. Polished stainless steel. | | Aro 1523 Bar Stool | | GREENGUARD Indoor Air | |
| 68 | Counter height stool. Polished stainless steel. | | Aro 1523 Bar Stool | | GREENGUARD Indoor Air | |
| 69 | Counter height stool. Polished stainless steel. | | Aro 1523 Bar Stool | | GREENGUARD Indoor Air | |
| 70 | Counter height stool. Polished stainless steel. | | Aro 1521 Bar Stool | | GREENGUARD Indoor Air | |
| 71 | Bar height stool. Polished stainless steel. Walnut | | Aro 1520 Bar Stool | | GREENGUARD Indoor Air | |
| 72 | Upholstered Bench. Polished stainless steel | | Cycle 2518 Bench | | GREENGUARD Indoor Air | |
| 73 | Upholstered Bench. Polished stainless steel | | Cycle 2518 Bench | | GREENGUARD Indoor Air | |
| 74 | Upholstered Bench. Polished stainless steel | | Cycle 2518 Bench | | GREENGUARD Indoor Air | |
| 75 | Upholstered Bench. Polished stainless steel | | Cycle 2536 Bench | | GREENGUARD Indoor Air | |
| 76 | Upholstered Bench. Polished stainless steel | | Cycle 2536 Bench | | GREENGUARD Indoor Air | |
| 77 | Upholstered Bench. Polished stainless steel | | Cycle 2536 Bench | | GREENGUARD Indoor Air | |
| 78 | Polished chrome stacking guest chair with high | | Coast 1125 Chair | | GREENGUARD Indoor Air | |

Fig. 1I

| | AE | AF | AG | AH | AI | AJ | AK | AL | AM |
|---|---|---|---|---|---|---|---|---|---|
| | warranty_info | status | tax_class_id | visibility | enable_googlecheckout | leather_manufacturer | leather_texture | color | fabric_measure_type |
| 1 | /bernhardt.html | Enabled | default | Nowhere | No | Bernhardt | Full grain | Black | square feet |
| 2 | /bernhardt.html | Enabled | default | Nowhere | No | Bernhardt | Full grain | Willow | square feet |
| 3 | /bernhardt.html | Enabled | default | Nowhere | No | Bernhardt | Full grain | Teal | square feet |
| 4 | /bernhardt.html | Enabled | default | Nowhere | No | Bernhardt | Full grain | Melon | square feet |
| 5 | /bernhardt.html | Enabled | default | Nowhere | No | Bernhardt | Full grain | Ivory | square feet |
| 6 | /bernhardt.html | Enabled | default | Nowhere | No | Bernhardt | Full grain | Camel | square feet |
| 7 | /bernhardt.html | Enabled | default | Nowhere | No | Bernhardt | Full grain | Seal | square feet |
| 8 | /bernhardt.html | Enabled | default | Nowhere | No | Bernhardt | Full grain | Atlantic | square feet |
| 9 | /bernhardt.html | Enabled | default | Nowhere | No | Bernhardt | Full grain | Magnolia | square feet |
| 10 | /bernhardt.html | Enabled | default | Nowhere | No | Bernhardt | Full grain | Mustard | square feet |
| 11 | /bernhardt.html | Enabled | default | Nowhere | No | Bernhardt | Full grain | Haze | square feet |
| 12 | /bernhardt.html | Enabled | default | Nowhere | No | Bernhardt | Full grain | Safari | square feet |
| 13 | /bernhardt.html | Enabled | default | Catalog, Search | No | Bernhardt | Full grain | Off White | square feet |
| 14 | /bernhardt.html | Enabled | default | Nowhere | No | Bernhardt | Full grain | Black | square feet |
| 15 | /bernhardt.html | Enabled | default | Nowhere | No | Bernhardt | Full grain | Thyme | square feet |
| 16 | /bernhardt.html | Enabled | default | Nowhere | No | Bernhardt | Full grain | Stone | square feet |
| 17 | /bernhardt.html | Enabled | default | Nowhere | No | Bernhardt | Full grain | Linen | square feet |
| 18 | /bernhardt.html | Enabled | default | Nowhere | No | Bernhardt | Full grain | Walnut | square feet |
| 19 | /bernhardt.html | Enabled | default | Nowhere | No | Bernhardt | Full grain | Dijon | square feet |
| 20 | /bernhardt.html | Enabled | default | Nowhere | No | Bernhardt | Full grain | Paper White | square feet |
| 21 | /bernhardt.html | Enabled | default | Nowhere | No | Bernhardt | Full grain | Birch | square feet |
| 22 | /bernhardt.html | Enabled | default | Nowhere | No | Bernhardt | Full grain | Khaki | square feet |
| 23 | /bernhardt.html | Enabled | default | Catalog, Search | No | Bernhardt | | Parchment | yards |
| 24 | /bernhardt.html | Enabled | default | Nowhere | No | | | Stone | yards |
| 25 | /bernhardt.html | Enabled | default | Nowhere | No | | | Oak | yards |
| 26 | /bernhardt.html | Enabled | default | Nowhere | No | | | Orche | yards |
| 27 | /bernhardt.html | Enabled | default | Nowhere | No | | | Laurel | yards |
| 28 | /bernhardt.html | Enabled | default | Nowhere | No | | | Juniper | yards |
| 29 | /bernhardt.html | Enabled | default | Nowhere | No | | | Lake | yards |
| 30 | /bernhardt.html | Enabled | default | Nowhere | No | | | Cinnabar | yards |
| 31 | /bernhardt.html | Enabled | default | Nowhere | No | | | Copper | yards |
| 32 | /bernhardt.html | Enabled | default | Catalog, Search | No | | | Bisquet | yards |
| 33 | /bernhardt.html | Enabled | default | Nowhere | No | | | Cane | yards |
| 34 | /bernhardt.html | Enabled | default | Nowhere | No | | | Lichen | yards |
| 35 | /bernhardt.html | Enabled | default | Nowhere | No | | | Clove | yards |
| 36 | /bernhardt.html | Enabled | default | Nowhere | No | | | Bark | yards |
| 37 | /bernhardt.html | Enabled | default | Catalog, Search | No | | | Cayenne | yards |
| 38 | /bernhardt.html | Enabled | default | Nowhere | No | | | | yards |

Fig. 1J

| | AE | AF | AG | AH | AI | AJ | AK | AL | AM |
|---|---|---|---|---|---|---|---|---|---|
| 44 | /bernhardt.html | Enabled | default | Nowhere | No | | | | |
| 45 | /bernhardt.html | Enabled | default | Catalog, Search | No | | | | |
| 46 | /bernhardt.html | Enabled | default | Catalog, Search | No | | | | |
| 47 | /bernhardt.html | Enabled | default | Catalog, Search | No | | | | |
| 48 | /bernhardt.html | Enabled | default | Catalog, Search | No | | | | |
| 49 | /bernhardt.html | Enabled | default | Nowhere | No | | | | |
| 50 | /bernhardt.html | Enabled | default | Nowhere | No | | | | |
| 51 | /bernhardt.html | Enabled | default | Catalog, Search | No | | | | |
| 52 | /bernhardt.html | Enabled | default | Nowhere | No | | | | |
| 53 | /bernhardt.html | Enabled | default | Nowhere | No | | | | |
| 54 | /bernhardt.html | Enabled | default | Catalog, Search | No | | | | |
| 55 | /bernhardt.html | Enabled | default | Nowhere | No | | | | |
| 56 | /bernhardt.html | Enabled | default | Nowhere | No | | | | |
| 57 | /bernhardt.html | Enabled | default | Catalog, Search | No | | | | |
| 58 | /bernhardt.html | Enabled | default | Nowhere | No | | | | |
| 59 | /bernhardt.html | Enabled | default | Nowhere | No | | | | |
| 60 | /bernhardt.html | Enabled | default | Catalog, Search | No | | | | |
| 61 | /bernhardt.html | Enabled | default | Nowhere | No | | | | |
| 62 | /bernhardt.html | Enabled | default | Nowhere | No | | | | |
| 63 | /bernhardt.html | Enabled | default | Catalog, Search | No | | | | |
| 64 | /bernhardt.html | Enabled | default | Nowhere | No | | | | |
| 65 | /bernhardt.html | Enabled | default | Nowhere | No | | | | |
| 66 | /bernhardt.html | Enabled | default | Catalog, Search | No | | | | |
| 67 | /bernhardt.html | Enabled | default | Nowhere | No | | | | |
| 68 | /bernhardt.html | Enabled | default | Nowhere | No | | | | |
| 69 | /bernhardt.html | Enabled | default | Catalog, Search | No | | | | |
| 70 | /bernhardt.html | Enabled | default | Catalog, Search | No | | | | |
| 71 | /bernhardt.html | Enabled | default | Catalog, Search | No | | | | |
| 72 | /bernhardt.html | Enabled | default | Nowhere | No | | | | |
| 73 | /bernhardt.html | Enabled | default | Catalog, Search | No | | | | |
| 74 | /bernhardt.html | Enabled | default | Catalog, Search | No | | | | |
| 75 | /bernhardt.html | Enabled | default | Nowhere | No | | | | |
| 76 | /bernhardt.html | Enabled | default | Nowhere | No | | | | |
| 77 | /bernhardt.html | Enabled | default | Catalog, Search | No | | | | |
| 78 | /bernhardt.html | Enabled | default | Catalog, Search | No | | | | |

Fig. 1K

| | AN | AO | AP | AQ | AR | AS | AT |
|---|---|---|---|---|---|---|---|
| | shipping_method | use_confi | pdf_name | sample_sku | hi_resolution_image | leather_catalog | manufacturer_information_detail |
| 1 | | | | | | | |
| 2 | UPS | 1 | | | | | |
| 3 | UPS | 1 | | | | | |
| 4 | UPS | 1 | | | | | |
| 5 | UPS | 1 | | | | | |
| 6 | UPS | 1 | | | | | |
| 7 | UPS | 1 | | | | | |
| 8 | UPS | 1 | | | | | |
| 9 | UPS | 1 | | | | | |
| 10 | UPS | 1 | | | | | |
| 11 | UPS | 1 | | | | | |
| 12 | UPS | 1 | | | | | |
| 13 | UPS | 1 | | | | | |
| 14 | UPS | 1 | | | | | |
| 15 | UPS | 1 | | | | | |
| 16 | UPS | 1 | | | | | |
| 17 | UPS | 1 | | | | | |
| 18 | UPS | 1 | | | | | |
| 19 | UPS | 1 | | | | | |
| 20 | UPS | 1 | | | | | |
| 21 | UPS | 1 | | | | | |
| 22 | UPS | 1 | | | | | |
| 23 | UPS | 1 | | | | | |
| 24 | UPS | 1 | | | | | |
| 25 | UPS | 1 | | | | | |
| 26 | UPS | 1 | | | | | |
| 27 | UPS | 1 | | | | | |
| 28 | UPS | 1 | | | | | |
| 29 | UPS | 1 | | | | | |
| 30 | UPS | 1 | | | | | |
| 31 | UPS | 1 | | | | | |
| 32 | UPS | 1 | | | | | |
| 33 | UPS | 1 | | | | | |
| 34 | UPS | 1 | | | | | |
| 35 | UPS | 1 | | | | | |
| 36 | UPS | 1 | | | | | |
| 37 | UPS | 1 | | | | | |
| 38 | UPS | 1 | | | | | |
| 39 | UPS | 1 | | | | | |
| 40 | UPS | 1 | | | | | |
| 41 | UPS | 1 | | | | | |
| 42 | UPS | 1 | | | /bh_affiliate_1612_1.jpg | | |
| 43 | Freightliner | | | | | | |

Fig. 1L

| | AN | AO | AP | AQ | AR | AS | AT |
|---|---|---|---|---|---|---|---|
| 44 | Freightliner | 1 | | | /bh_affiliate_1612_1.jpg | | |
| 45 | Freightliner | 1 | | | /bh_affiliate_1612_1.jpg | | |
| 46 | Freightliner | 1 | | | | | |
| 47 | Freightliner | 1 | | | | | |
| 48 | Freightliner | 1 | | | | | |
| 49 | Freightliner | 1 | | | | | |
| 50 | Freightliner | 1 | | | | | |
| 51 | Freightliner | 1 | | | | | |
| 52 | Freightliner | 1 | | | | | |
| 53 | Freightliner | 1 | | | | | |
| 54 | Freightliner | 1 | | | | | |
| 55 | Freightliner | 1 | | | | | |
| 56 | Freightliner | 1 | | | | | |
| 57 | Freightliner | 1 | | | | | |
| 58 | Freightliner | 1 | | | | | |
| 59 | Freightliner | 1 | | | | | |
| 60 | Freightliner | 1 | | | | | |
| 61 | Freightliner | 1 | | | | | |
| 62 | Freightliner | 1 | | | | | |
| 63 | Freightliner | 1 | | | | | |
| 64 | Freightliner | 1 | | | | | |
| 65 | Freightliner | 1 | | | | | |
| 66 | Freightliner | 1 | | | | | |
| 67 | Freightliner | 1 | | | | | |
| 68 | Freightliner | 1 | | | | | |
| 69 | Freightliner | 1 | | | | | |
| 70 | Freightliner | 1 | | | | | |
| 71 | Freightliner | 1 | | | | | |
| 72 | Freightliner | 1 | | | | | |
| 73 | Freightliner | 1 | | | | | |
| 74 | Freightliner | 1 | | | | | |
| 75 | Freightliner | 1 | | | | | |
| 76 | Freightliner | 1 | | | | | |
| 77 | Freightliner | 1 | | | | | |
| 78 | Freightliner | 1 | | | | | |

Fig. 1M

| | AU | AV | AW | AX | AY | AZ | BA | BB | BC |
|---|---|---|---|---|---|---|---|---|---|
| | required_options | leather_price | textile_literature | textile_origin | textile_designer | textile_repeat | textile_durability | textile_category | textile_catalog |
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | | | | | | |
| 25 | | | | | | | | | |
| 26 | | | | SC, USA | Teri Figiluzzi | 8 | 95,000 double rubs | Textiles | |
| 27 | | | | SC, USA | Teri Figiluzzi | 8 | 95,000 double rubs | Textiles | |
| 28 | | | | SC, USA | Teri Figiluzzi | 8 | 95,000 double rubs | Textiles | |
| 29 | | | | SC, USA | Teri Figiluzzi | 8 | 95,000 double rubs | Textiles | |
| 30 | | | | SC, USA | Teri Figiluzzi | 8 | 95,000 double rubs | Textiles | |
| 31 | | | | SC, USA | Teri Figiluzzi | 8 | 95,000 double rubs | Textiles | |
| 32 | | | | SC, USA | Teri Figiluzzi | 8 | 95,000 double rubs | Textiles | |
| 33 | | | | SC, USA | Teri Figiluzzi | 8 | 95,000 double rubs | Textiles | |
| 34 | | | | SC, USA | Teri Figiluzzi | 8 | 95,000 double rubs | Textiles | |
| 35 | | | | SC, USA | Teri Figiluzzi | 8 | 95,000 double rubs | Textiles | |
| 36 | | | | SC, USA | Teri Figiluzzi | 7 | 100,000 double | Textiles | |
| 37 | | | | SC, USA | Teri Figiluzzi | 7 | 100,000 double | Textiles | |
| 38 | | | | SC, USA | Teri Figiluzzi | 7 | 100,000 double | Textiles | |
| 39 | | | | SC, USA | Teri Figiluzzi | 7 | 100,000 double | Textiles | |
| 40 | | | | SC, USA | Teri Figiluzzi | 7 | 100,000 double | Textiles | |
| 41 | | | | SC, USA | Teri Figiluzzi | 7 | 100,000 double | Textiles | |
| 42 | | | | SC, USA | Teri Figiluzzi | 7 | 100,000 double | Textiles | |
| 43 | | | | | | | | | |

| | BD | BE | BF | BG | BH | BI | BJ | BK |
|---|---|---|---|---|---|---|---|---|
| | textile_fiber_content | designer_info | textile_manufacturer | textile_pattern | thumbnail_label | small_image_label | image_label | fabric_price |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | 56% Acrylic; 44% Polyester | | Bernhardt Design | Bark | | | | |
| 26 | 56% Acrylic; 44% Polyester | | Bernhardt Design | Bark | | | | |
| 27 | 56% Acrylic; 44% Polyester | | Bernhardt Design | Bark | | | | |
| 28 | 56% Acrylic; 44% Polyester | | Bernhardt Design | Bark | | | | |
| 29 | 56% Acrylic; 44% Polyester | | Bernhardt Design | Bark | | | | |
| 30 | 56% Acrylic; 44% Polyester | | Bernhardt Design | Bark | | | | |
| 31 | 56% Acrylic; 44% Polyester | | Bernhardt Design | Bark | | | | |
| 32 | 56% Acrylic; 44% Polyester | | Bernhardt Design | Bark | | | | |
| 33 | 56% Acrylic; 44% Polyester | | Bernhardt Design | Bark | | | | |
| 34 | 56% Acrylic; 44% Polyester | | Bernhardt Design | Bark | | | | |
| 35 | 56% Acrylic; 44% Polyester | | Bernhardt Design | Bark | | | | |
| 36 | 44% Cotton; 29% Rayon; 27% | | Bernhardt Design | Asteroids | | | | |
| 37 | 44% Cotton; 29% Rayon; 27% | | Bernhardt Design | Asteroids | | | | |
| 38 | 44% Cotton; 29% Rayon; 27% | | Bernhardt Design | Asteroids | | | | |
| 39 | 44% Cotton; 29% Rayon; 27% | | Bernhardt Design | Asteroids | | | | |
| 40 | 44% Cotton; 29% Rayon; 27% | | Bernhardt Design | Asteroids | | | | |
| 41 | 44% Cotton; 29% Rayon; 27% | | Bernhardt Design | Asteroids | | | | |
| 42 | 44% Cotton; 29% Rayon; 27% | | Bernhardt Design | Asteroids | | | | |
| 43 | | | | | | | | |

| | BL | BM | BN | BO | BP | BQ | BR | BS |
|---|---|---|---|---|---|---|---|---|
| 1 | furniture_origin | fabric_required | leather_required | furniture_leadtime | furniture_category | furniture_catalog | furniture_leather_price | delivery_charge |
| 2 | | | | 2 weeks | Upholstery/Leathers | | | |
| 3 | | | | 2 weeks | Upholstery/Leathers | | | |
| 4 | | | | 2 weeks | Upholstery/Leathers | | | |
| 5 | | | | 2 weeks | Upholstery/Leathers | | | |
| 6 | | | | 2 weeks | Upholstery/Leathers | | | |
| 7 | | | | 2 weeks | Upholstery/Leathers | | | |
| 8 | | | | 2 weeks | Upholstery/Leathers | | | |
| 9 | | | | 2 weeks | Upholstery/Leathers | | | |
| 10 | | | | 2 weeks | Upholstery/Leathers | | | |
| 11 | | | | 2 weeks | Upholstery/Leathers | | | |
| 12 | | | | 2 weeks | Upholstery/Leathers | | | |
| 13 | | | | 2 weeks | Upholstery/Leathers | | | |
| 14 | | | | 2 weeks | Upholstery/Leathers | | | |
| 15 | | | | 2 weeks | Upholstery/Leathers | | | |
| 16 | | | | 2 weeks | Upholstery/Leathers | | | |
| 17 | | | | 2 weeks | Upholstery/Leathers | | | |
| 18 | | | | 2 weeks | Upholstery/Leathers | | | |
| 19 | | | | 2 weeks | Upholstery/Leathers | | | |
| 20 | | | | 2 weeks | Upholstery/Leathers | | | |
| 21 | | | | 2 weeks | Upholstery/Leathers | | | |
| 22 | | | | 2 weeks | Upholstery/Leathers | | | |
| 23 | | | | 2 weeks | Upholstery/Leathers | | | |
| 24 | | | | 2 weeks | Upholstery/Leathers | | | |
| 25 | | | | 2 weeks | Upholstery/Leathers | | | |
| 26 | | | | 2 weeks | Upholstery/Textiles | | | |
| 27 | | | | 2 weeks | Upholstery/Textiles | | | |
| 28 | | | | 2 weeks | Upholstery/Textiles | | | |
| 29 | | | | 2 weeks | Upholstery/Textiles | | | |
| 30 | | | | 2 weeks | Upholstery/Textiles | | | |
| 31 | | | | 2 weeks | Upholstery/Textiles | | | |
| 32 | | | | 2 weeks | Upholstery/Textiles | | | |
| 33 | | | | 2 weeks | Upholstery/Textiles | | | |
| 34 | | | | 2 weeks | Upholstery/Textiles | | | |
| 35 | | | | 2 weeks | Upholstery/Textiles | | | |
| 36 | | | | 2 weeks | Upholstery/Textiles | | | |
| 37 | | | | 2 weeks | Upholstery/Textiles | | | |
| 38 | | | | 2 weeks | Upholstery/Textiles | | | |
| 39 | | | | 2 weeks | Upholstery/Textiles | | | |
| 40 | | | | 2 weeks | Upholstery/Textiles | | | |
| 41 | | | | 2 weeks | Upholstery/Textiles | | | |
| 42 | | | | 2 weeks | Upholstery/Textiles | | | |
| 43 | SC, USA | 2 | 30 | 8 weeks | Seating/Chair | | 870 | |

Fig. 1R

| | BL | BM | BN | BO | BP | BQ | BR | BS |
|---|---|---|---|---|---|---|---|---|
| 44 | SC, USA | 2 | 30 | 8 weeks | Seating/Chair | | 870 | |
| 45 | SC, USA | 2 | 30 | 8 weeks | Seating/Chair | | 870 | |
| 46 | SC, USA | | | 8 weeks | Tables/Occasional | | | |
| 47 | SC, USA | | | 8 weeks | Tables/Occasional | | | |
| 48 | SC, USA | | | 8 weeks | Tables/Occasional | | | |
| 49 | SC, USA | 2 | 30 | 8 weeks | Seating/Chair | | 1045 | |
| 50 | SC, USA | 2 | 30 | 8 weeks | Seating/Chair | | 1045 | |
| 51 | SC, USA | 2 | 30 | 8 weeks | Seating/Chair | | 1045 | |
| 52 | SC, USA | 7 | 130 | 8 weeks | Seating/Lounge | | 1770 | |
| 53 | SC, USA | 7 | 130 | 8 weeks | Seating/Lounge | | 1770 | |
| 54 | SC, USA | 7 | 130 | 8 weeks | Seating/Lounge | | 1770 | |
| 55 | SC, USA | 7 | 130 | 8 weeks | Seating/Lounge | | 1770 | |
| 56 | SC, USA | 7 | 130 | 8 weeks | Seating/Lounge | | 1770 | |
| 57 | SC, USA | 7 | 130 | 8 weeks | Seating/Lounge | | 1770 | |
| 58 | SC, USA | 18 | 300 | 8 weeks | Seating/Sofa | | 4100 | |
| 59 | SC, USA | 18 | 300 | 8 weeks | Seating/Sofa | | 4100 | |
| 60 | SC, USA | 18 | 300 | 8 weeks | Seating/Sofa | | 4100 | |
| 61 | SC, USA | 18 | 300 | 8 weeks | Seating/Sofa | | 4100 | |
| 62 | SC, USA | 18 | 300 | 8 weeks | Seating/Sofa | | 4100 | |
| 63 | SC, USA | 18 | 300 | 8 weeks | Seating/Sofa | | 4100 | |
| 64 | SC, USA | 1 | 10 | 8 weeks | Seating/Stool | | 975 | |
| 65 | SC, USA | 1 | 10 | 8 weeks | Seating/Stool | | 975 | |
| 66 | SC, USA | 1 | 10 | 8 weeks | Seating/Stool | | 975 | |
| 67 | SC, USA | 1 | 10 | 8 weeks | Seating/Stool | | 870 | |
| 68 | SC, USA | 1 | 10 | 8 weeks | Seating/Stool | | 870 | |
| 69 | SC, USA | 1 | 10 | 8 weeks | Seating/Stool | | 870 | |
| 70 | SC, USA | | | 8 weeks | Seating/Stool | | | |
| 71 | SC, USA | | | 8 weeks | Seating/Chair | | | |
| 72 | SC, USA | 2 | 30 | 8 weeks | Seating/Bench | | 700 | |
| 73 | SC, USA | 2 | 30 | 8 weeks | Seating/Bench | | 700 | |
| 74 | SC, USA | 2 | 30 | 8 weeks | Seating/Bench | | 700 | |
| 75 | SC, USA | 2 | 30 | 8 weeks | Seating/Bench | | 1040 | |
| 76 | SC, USA | 2 | 30 | 8 weeks | Seating/Bench | | 1040 | |
| 77 | SC, USA | 2 | 30 | 8 weeks | Seating/Bench | | 1040 | |
| 78 | SC, USA | | | 8 weeks | Seating/Chair | | | |

Fig. 1S

| | BT | BU | BV | | BW | BX | BY |
|---|---|---|---|---|---|---|---|
| 1 | furniture_fabric_price | dimension | product_description | | furniture_manufacturer | furniture_designer | furniture_style |
| 2 | | | Uncorrected natural full grain leather | | | | |
| 3 | | | Uncorrected natural full grain leather | | | | |
| 4 | | | Uncorrected natural full grain leather | | | | |
| 5 | | | Uncorrected natural full grain leather | | | | |
| 6 | | | Uncorrected natural full grain leather | | | | |
| 7 | | | Uncorrected natural full grain leather | | | | |
| 8 | | | Uncorrected natural full grain leather | | | | |
| 9 | | | Uncorrected natural full grain leather | | | | |
| 10 | | | Uncorrected natural full grain leather | | | | |
| 11 | | | Uncorrected natural full grain leather | | | | |
| 12 | | | Uncorrected natural full grain leather | | | | |
| 13 | | | Uncorrected natural full grain leather | | | | |
| 14 | | | Uncorrected natural full grain leather | | | | |
| 15 | | | Enhanced full grain leather with slight | | | | |
| 16 | | | Enhanced full grain leather with slight | | | | |
| 17 | | | Enhanced full grain leather with slight | | | | |
| 18 | | | Enhanced full grain leather with slight | | | | |
| 19 | | | Enhanced full grain leather with slight | | | | |
| 20 | | | Enhanced full grain leather with slight | | | | |
| 21 | | | Enhanced full grain leather with slight | | | | |
| 22 | | | Enhanced full grain leather with slight | | | | |
| 23 | | | Enhanced full grain leather with slight | | | | |
| 24 | | | Enhanced full grain leather with slight | | | | |
| 25 | | | Enhanced full grain leather with slight | | | | |
| 26 | | | Bark is a contemporary textile with a | | | | Contemporary |
| 27 | | | Bark is a contemporary textile with a | | | | Contemporary |
| 28 | | | Bark is a contemporary textile with a | | | | Contemporary |
| 29 | | | Bark is a contemporary textile with a | | | | Contemporary |
| 30 | | | Bark is a contemporary textile with a | | | | Contemporary |
| 31 | | | Bark is a contemporary textile with a | | | | Contemporary |
| 32 | | | Bark is a contemporary textile with a | | | | Contemporary |
| 33 | | | Bark is a contemporary textile with a | | | | Contemporary |
| 34 | | | Bark is a contemporary textile with a | | | | Contemporary |
| 35 | | | Bark is a contemporary textile with a | | | | Contemporary |
| 36 | | | Asteroids is a contemporary textile with | | | | Contemporary |
| 37 | | | Asteroids is a contemporary textile with | | | | Contemporary |
| 38 | | | Asteroids is a contemporary textile with | | | | Contemporary |
| 39 | | | Asteroids is a contemporary textile with | | | | Contemporary |
| 40 | | | Asteroids is a contemporary textile with | | | | Contemporary |
| 41 | | | Asteroids is a contemporary textile with | | | | Contemporary |
| 42 | | | Asteroids is a contemporary textile with | | | | Contemporary |
| 43 | 890 | 18.125 SH, 19.5 W, 24.5 | Upholstered guest chair available w/ | | Bernhardt Design | Suzanne Trocmé½ | Contemporary |

Fig. 1T

| | BT | BU | BV | BW | BX | BY |
|---|---|---|---|---|---|---|
| 44 | 830 | 18.125 SH, 19.5 W, 24.5 | Upholstered guest chair available w/ | Bernhardt Design | Suzanne Trocmé½ | Contemporary |
| 45 | 830 | 18.125 SH, 19.5 W, 24.5 | Upholstered guest chair available w/ | Bernhardt Design | Suzanne Trocmé½ | Contemporary |
| 46 | | 21 W, 21 D, 20 H | Square occasional table with 3-ply top | Bernhardt Design | Fabien Baron | Contemporary |
| 47 | | 26 W, 20 D, 20 H | Rectangular occasional table with 3-ply | Bernhardt Design | Fabien Baron | Contemporary |
| 48 | | 42 W, 42 D, 15 H | Square occasional table with 3-ply top | Bernhardt Design | Fabien Baron | Contemporary |
| 49 | 1010 | 19 SH, 25.5 AH, 21 W, | Guest chair available w/ maple solids, | Bernhardt Design | Fabien Baron | Contemporary |
| 50 | 1010 | 19 SH, 25.5 AH, 21 W, | Guest chair available w/ maple solids, | Bernhardt Design | Fabien Baron | Contemporary |
| 51 | 1010 | 19 SH, 25.5 AH, 21 W, | Guest chair available w/ maple solids, | Bernhardt Design | Fabien Baron | Contemporary |
| 52 | 1635 | 17.5 SH, 26.25 AH, 35.5 | Fully upholstered lounge chair w/ loosely | Bernhardt Design | Fabien Baron | Contemporary |
| 53 | 1635 | 17.5 SH, 26.25 AH, 35.5 | Fully upholstered lounge chair w/ loosely | Bernhardt Design | Fabien Baron | Contemporary |
| 54 | 1635 | 17.5 SH, 26.25 AH, 35.5 | Fully upholstered lounge chair w/ loosely | Bernhardt Design | Fabien Baron | Contemporary |
| 55 | 1635 | 17.5 SH, 26.25 AH, 35.5 | Fully upholstered lounge chair | Bernhardt Design | Fabien Baron | Contemporary |
| 56 | 1635 | 17.5 SH, 26.25 AH, 35.5 | Fully upholstered lounge chair | Bernhardt Design | Fabien Baron | Contemporary |
| 57 | 1635 | 17.5 SH, 26.25 AH, 35.5 | Fully upholstered lounge chair | Bernhardt Design | Fabien Baron | Contemporary |
| 58 | 3745 | 17.5 SH, 26.25 AH, 95 | Fully upholstered 3 seat sofa w/ loosely | Bernhardt Design | Fabien Baron | Contemporary |
| 59 | 3745 | 17.5 SH, 26.25 AH, 95 | Fully upholstered 3 seat sofa w/ loosely | Bernhardt Design | Fabien Baron | Contemporary |
| 60 | 3745 | 17.5 SH, 26.25 AH, 95 | Fully upholstered 3 seat sofa w/ loosely | Bernhardt Design | Fabien Baron | Contemporary |
| 61 | 3745 | 17.5 SH, 26.25 AH, 95 | Fully upholstered 3 seat sofa w/ loosely | Bernhardt Design | Fabien Baron | Contemporary |
| 62 | 3745 | 17.5 SH, 26.25 AH, 95 | Fully upholstered 3 seat sofa w/ loosely | Bernhardt Design | Fabien Baron | Contemporary |
| 63 | 3745 | 17.5 SH, 26.25 AH, 95 | Fully upholstered 3 seat sofa w/ loosely | Bernhardt Design | Fabien Baron | Contemporary |
| 64 | 965 | 31.75 SH, 16.25 W, | Bar Stool. Polished stainless steel. | Bernhardt Design | Lievore Altherr Molina | Contemporary |
| 65 | 965 | 31.75 SH, 16.25 W, | Bar Stool. Polished stainless steel. | Bernhardt Design | Lievore Altherr Molina | Contemporary |
| 66 | 965 | 31.75 SH, 16.25 W, | Bar Stool. Polished stainless steel. | Bernhardt Design | Lievore Altherr Molina | Contemporary |
| 67 | 860 | 24 SH, 15.75 W, 15.75 D, | Counter height stool. Polished stainless | Bernhardt Design | Lievore Altherr Molina | Contemporary |
| 68 | 860 | 24 SH, 15.75 W, 15.75 D, | Counter height stool. Polished stainless | Bernhardt Design | Lievore Altherr Molina | Contemporary |
| 69 | 860 | 24 SH, 15.75 W, 15.75 D, | Counter height stool. Polished stainless | Bernhardt Design | Lievore Altherr Molina | Contemporary |
| 70 | | 24 SH, 15.75 W, 15.75 D, | Counter height stool. Polished stainless | Bernhardt Design | Lievore Altherr Molina | Contemporary |
| 71 | | 31.75 SH, 16.25 W, | Bar height stool. Polished stainless steel. | Bernhardt Design | Lievore Altherr Molina | Contemporary |
| 72 | 670 | 18 SH, 23.5 W, 23.5 D, | Upholstered Bench. Polished stainless | Bernhardt Design | Hans and Franz | Contemporary |
| 73 | 670 | 18 SH, 23.5 W, 23.5 D, | Upholstered Bench. Polished stainless | Bernhardt Design | Hans and Franz | Contemporary |
| 74 | 670 | 18 SH, 23.5 W, 23.5 D, | Upholstered Bench. Polished stainless | Bernhardt Design | Hans and Franz | Contemporary |
| 75 | 980 | 18 SH, 42 W, 42 D, 18 H | Upholstered Bench. Polished stainless | Bernhardt Design | Hans and Franz | Contemporary |
| 76 | 980 | 18 SH, 42 W, 42 D, 18 H | Upholstered Bench. Polished stainless | Bernhardt Design | Hans and Franz | Contemporary |
| 77 | 980 | 18 SH, 42 W, 42 D, 18 H | Upholstered Bench. Polished stainless | Bernhardt Design | Hans and Franz | Contemporary |
| 78 | | 18 SH, 23.5 W, 22.5 D, | Polished chrome stacking guest chair | Bernhardt Design | Pearson Lloyd | Contemporary |

Fig. 1U

| | BZ | CA | CB | CC | CD | CE | CF |
|---|---|---|---|---|---|---|---|
| 1 | furniture_room | furniture_covering | covering_selection | materials | price_no_covering | news_from_date | news_to_date |
| 2 | Living | | 0 | 100% Full grain leather | | | |
| 3 | Living | | 0 | 100% Full grain leather | | | |
| 4 | Living | | 0 | 100% Full grain leather | | | |
| 5 | Living | | 0 | 100% Full grain leather | | | |
| 6 | Living | | 0 | 100% Full grain leather | | | |
| 7 | Living | | 0 | 100% Full grain leather | | | |
| 8 | Living | | 0 | 100% Full grain leather | | | |
| 9 | Living | | 0 | 100% Full grain leather | | | |
| 10 | Living | | 0 | 100% Full grain leather | | | |
| 11 | Living | | 0 | 100% Full grain leather | | | |
| 12 | Living | | 0 | 100% Full grain leather | | | |
| 13 | Living | | 0 | 100% Full grain leather | | | |
| 14 | Living | | 0 | 100% Full grain leather | | | |
| 15 | Living | | 0 | 100% Full grain leather | | | |
| 16 | Living | | 0 | 100% Full grain leather | | | |
| 17 | Living | | 0 | 100% Full grain leather | | | |
| 18 | Living | | 0 | 100% Full grain leather | | | |
| 19 | Living | | 0 | 100% Full grain leather | | | |
| 20 | Living | | 0 | 100% Full grain leather | | | |
| 21 | Living | | 0 | 100% Full grain leather | | | |
| 22 | Living | | 0 | 100% Full grain leather | | | |
| 23 | Living | | 0 | 100% Full grain leather | | | |
| 24 | Living | | 0 | 100% Full grain leather | | | |
| 25 | Living | | 0 | 100% Full grain leather | | | |
| 26 | Living | | 0 | 56% Acrylic; 44% Polyester | | | |
| 27 | Living | | 0 | 56% Acrylic; 44% Polyester | | | |
| 28 | Living | | 0 | 56% Acrylic; 44% Polyester | | | |
| 29 | Living | | 0 | 56% Acrylic; 44% Polyester | | | |
| 30 | Living | | 0 | 56% Acrylic; 44% Polyester | | | |
| 31 | Living | | 0 | 56% Acrylic; 44% Polyester | | | |
| 32 | Living | | 0 | 56% Acrylic; 44% Polyester | | | |
| 33 | Living | | 0 | 56% Acrylic; 44% Polyester | | | |
| 34 | Living | | 0 | 56% Acrylic; 44% Polyester | | | |
| 35 | Living | | 0 | 56% Acrylic; 44% Polyester | | | |
| 36 | Living | | 0 | 44% Cotton; 29% Rayon; 27% | | | |
| 37 | Living | | 0 | 44% Cotton; 29% Rayon; 27% | | | |
| 38 | Living | | 0 | 44% Cotton; 29% Rayon; 27% | | | |
| 39 | Living | | 0 | 44% Cotton; 29% Rayon; 27% | | | |
| 40 | Living | | 0 | 44% Cotton; 29% Rayon; 27% | | | |
| 41 | Living | | 0 | 44% Cotton; 29% Rayon; 27% | | | |
| 42 | Living, Dining | | 0 | 44% Cotton; 29% Rayon; 27% | | | |
| 43 | Living, Dining | Leather | 0 | | | | |

Fig. 1V

| | BZ | CA | CB | CC | CD | CE | CF |
|---|---|---|---|---|---|---|---|
| 44 | Living, Dining | Fabric | 0 | | | | |
| 45 | Living, Dining | | 1 | | | | |
| 46 | Living | | 0 | | | | |
| 47 | Living | | 0 | | 1420 | | |
| 48 | Living | | 0 | | 1480 | | |
| 49 | Living, Dining | Leather | 0 | | 2460 | | |
| 50 | Living, Dining | Fabric | 0 | | | | |
| 51 | Living, Dining | | 1 | | | | |
| 52 | Living | Leather | 0 | | | | |
| 53 | Living | Fabric | 0 | | | | |
| 54 | Living | | 1 | | | | |
| 55 | Living | Leather | 0 | | | | |
| 56 | Living | Fabric | 0 | | | | |
| 57 | Living | | 1 | | | | |
| 58 | Living | Leather | 0 | | | | |
| 59 | Living | Fabric | 0 | | | | |
| 60 | Living | | 1 | | | | |
| 61 | Living | Leather | 0 | | | | |
| 62 | Living | Fabric | 0 | | | | |
| 63 | Living | | 1 | | | | |
| 64 | Living | Leather | 0 | | | | |
| 65 | Living | Fabric | 0 | | | | |
| 66 | Living | | 1 | | | | |
| 67 | Living | Leather | 0 | | | | |
| 68 | Living | Fabric | 1 | | | | |
| 69 | Living | | 0 | | | | |
| 70 | Living | | 0 | | 965 | | |
| 71 | Living | | 0 | | 1072 | | |
| 72 | Living | Leather | 0 | | | | |
| 73 | Living | Fabric | 0 | | | | |
| 74 | Living | | 1 | | | | |
| 75 | Living | Leather | 0 | | | | |
| 76 | Living | Fabric | 0 | | | | |
| 77 | Living | | 1 | | | | |
| 78 | Living, Office | | 0 | | 410 | | |

Fig. 1W

| | CG | CH | CI | CJ | CK | CL | CM |
|---|---|---|---|---|---|---|---|
| | associated | related | associated_options | image_exclude | small_image_exclude | thumbnail_exclude | hi_resolution_image_exclude |
| 1 | | | | | | | |
| 2 | | | | 0 | 0 | 0 | 0 |
| 3 | | | | 0 | 0 | 0 | 0 |
| 4 | | | | 0 | 0 | 0 | 0 |
| 5 | | | | | | | |
| 6 | | | | 0 | 0 | 0 | 0 |
| 7 | | | | 0 | 0 | 0 | 0 |
| 8 | | | | 0 | 0 | 0 | 0 |
| 9 | | | | 0 | 0 | 0 | 0 |
| 10 | | | | 0 | 0 | 0 | 0 |
| 11 | | | | 0 | 0 | 0 | 0 |
| 12 | | | | 0 | 0 | 0 | 0 |
| 13 | | | | 0 | 0 | 0 | 0 |
| 14 | BH_3100-001, BH_3100-003, | | | 0 | 0 | 0 | 0 |
| 15 | | | | 0 | 0 | 0 | 0 |
| 16 | | | | 0 | 0 | 0 | 0 |
| 17 | | | | 0 | 0 | 0 | 0 |
| 18 | | | | 0 | 0 | 0 | 0 |
| 19 | | | | 0 | 0 | 0 | 0 |
| 20 | | | | 0 | 0 | 0 | 0 |
| 21 | | | | 0 | 0 | 0 | 0 |
| 22 | | | | 0 | 0 | 0 | 0 |
| 23 | | | | 0 | 0 | 0 | 0 |
| 24 | | | | 0 | 0 | 0 | 0 |
| 25 | BH_3105-000, BH_3105-001, | | | 0 | 0 | 0 | 0 |
| 26 | | | | 0 | 0 | 0 | 0 |
| 27 | | | | 0 | 0 | 0 | 0 |
| 28 | | | | 0 | 0 | 0 | 0 |
| 29 | | | | 0 | 0 | 0 | 0 |
| 30 | | | | 0 | 0 | 0 | 0 |
| 31 | | | | 0 | 0 | 0 | 0 |
| 32 | | | | 0 | 0 | 0 | 0 |
| 33 | | | | 0 | 0 | 0 | 0 |
| 34 | | | | 0 | 0 | 0 | 0 |
| 35 | BH_3377_900, BH_3377_912, | | | 0 | 0 | 0 | 0 |
| 36 | | | | 0 | 0 | 0 | 0 |
| 37 | | | | 0 | 0 | 0 | 0 |
| 38 | | | | 0 | 0 | 0 | 0 |
| 39 | | | | 0 | 0 | 0 | 0 |
| 40 | | | | 0 | 0 | 0 | 0 |
| 41 | | | | 0 | 0 | 0 | 0 |
| 42 | BH_3346-077, BH_3346-022, | | | 0 | 0 | 0 | 0 |
| 43 | | | | 0 | 0 | 0 | 0 |

Fig. 1X

| | CG | CH | CI | CJ | CK | CL | CM |
|---|---|---|---|---|---|---|---|
| 44 | | | | | | | |
| 45 | BH_1612-L, BH_1612-F | | furniture_covering:Fabric:0 | 0 | 0 | 0 | |
| 46 | | | | 0 | 0 | 0 | |
| 47 | | | | 0 | 0 | 0 | |
| 48 | | | | 0 | 0 | 0 | |
| 49 | | | | 0 | 0 | 0 | |
| 50 | | | | 0 | 0 | 0 | |
| 51 | BH_1516-L, BH_1516-F | | furniture_covering:Fabric:0 | 0 | 0 | 0 | |
| 52 | | | | 0 | 0 | 0 | |
| 53 | | | | 0 | 0 | 0 | |
| 54 | BH_4302AS-L, BH_4302AS-F | | furniture_covering:Fabric:0 | 0 | 0 | 0 | |
| 55 | | | | 0 | 0 | 0 | |
| 56 | | | | 0 | 0 | 0 | |
| 57 | BH_4302BS-L, BH_4302BS-F | | furniture_covering:Fabric:0 | 0 | 0 | 0 | |
| 58 | | | | 0 | 0 | 0 | |
| 59 | | | | 0 | 0 | 0 | |
| 60 | BH_4337AS-L, BH_4337AS-F | | furniture_covering:Fabric:0 | 0 | 0 | 0 | |
| 61 | | | | 0 | 0 | 0 | |
| 62 | | | | 0 | 0 | 0 | |
| 63 | BH_4337BS-L, BH_4337BS-F | | furniture_covering:Fabric:0 | 0 | 0 | 0 | |
| 64 | | | | 0 | 0 | 0 | |
| 65 | | | | 0 | 0 | 0 | |
| 66 | BH_1522-L, BH_1522-F | | furniture_covering:Fabric:0 | 0 | 0 | 0 | |
| 67 | | | | 0 | 0 | 0 | |
| 68 | | | | 0 | 0 | 0 | |
| 69 | BH_1523-L, BH_1523-F | | furniture_covering:Fabric:0 | 0 | 0 | 0 | |
| 70 | | | | 0 | 0 | 0 | |
| 71 | | | | 0 | 0 | 0 | |
| 72 | | | | 0 | 0 | 0 | |
| 73 | | | | 0 | 0 | 0 | |
| 74 | BH_2518-L, BH_2518-F | | furniture_covering:Fabric:0 | 0 | 0 | 0 | |
| 75 | | | | 0 | 0 | 0 | |
| 76 | | | | 0 | 0 | 0 | |
| 77 | BH_2536-L, BH_2536-F | | furniture_covering:Fabric:0 | 0 | 0 | 0 | |
| 78 | | | | 0 | 0 | 0 | |

Fig. 1Y

| | CN | CO | CP | CQ |
|---|---|---|---|---|
| | covering_sku_fabric | covering_sku_leather | gallery | custom_options_attributes |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |
| 25 | | | | |
| 26 | | | | |
| 27 | | | | |
| 28 | | | | |
| 29 | | | | |
| 30 | | | | |
| 31 | | | | |
| 32 | | | | |
| 33 | | | | |
| 34 | | | | |
| 35 | | | | |
| 36 | | | | |
| 37 | | | | |
| 38 | | | | |
| 39 | | | | |
| 40 | | | | |
| 41 | | | | |
| 42 | | | | |
| 43 | | | | |

Fig. 1Z

| | CN | CO | CP | CQ |
|---|---|---|---|---|
| 44 | | | | |
| 45 | BH_3346,BH_3377 | BH_3105,BH_3100 | /bh_affiliate_1612_line.jpg,/ | Finish:drop_down:1:0|Light Maple 837:fixed:0:837:0|Honey Maple 836:fixed:0:836:1|Brown on |
| 46 | | | /bh_b5_alt1.jpg | Finish:drop_down:1:0|Light Anigre 850:fixed:0:850:0|Honey Anigre 836:fixed:0:836:1|Light Brown |
| 47 | | | /bh_b5_alt1.jpg | Finish:drop_down:1:0|Light Anigre 850:fixed:0:850:0|Honey Anigre 836:fixed:0:836:1|Light Brown |
| 48 | | | /bh_b5_alt1.jpg | Finish:drop_down:1:0|Light Anigre 850:fixed:0:850:0|Honey Anigre 836:fixed:0:836:1|Light Brown |
| 49 | | | | |
| 50 | | | | |
| 51 | BH_3346,BH_3377 | BH_3105,BH_3100 | /bh_b4- | Finish:drop_down:1:0|Light Maple 837:fixed:0:837:0|Honey Maple 836:fixed:0:836:1|Brown on |
| 52 | | | | |
| 53 | | | | |
| 54 | BH_3346,BH_3377 | BH_3105,BH_3100 | /bh_b1- | |
| 55 | | | | |
| 56 | | | | |
| 57 | BH_3346,BH_3377 | BH_3105,BH_3100 | /bh_b1- | |
| 58 | | | | |
| 59 | | | | |
| 60 | BH_3346,BH_3377 | BH_3105,BH_3100 | /bh_b1- | |
| 61 | | | | |
| 62 | | | | |
| 63 | BH_3346,BH_3377 | BH_3105,BH_3100 | /bh_b1- | |
| 64 | | | | |
| 65 | | | | |
| 66 | BH_3346,BH_3377 | BH_3105,BH_3100 | /bh_aro_detail2.jpg,/bh_aro | |
| 67 | | | | |
| 68 | | | | |
| 69 | BH_3346,BH_3377 | BH_3105,BH_3100 | /bh_aro_detail2.jpg,/bh_aro | Finish:drop_down:1:0|Light Brown on Walnut 860:fixed:0:860:0|Medium Brown on Walnut |
| 70 | | | /bh_aro_alt1.jpg,/bh_aro_al | Finish:drop_down:1:0|Light Brown on Walnut 860:fixed:0:860:0|Medium Brown on Walnut |
| 71 | | | /bh_aro_alt1.jpg,/bh_aro_al | Finish:drop_down:1:0|Light Brown on Walnut 860:fixed:0:860:0|Medium Brown on Walnut |
| 72 | | | | |
| 73 | | | | |
| 74 | BH_3346,BH_3377 | BH_3105,BH_3100 | /bh_cycle_2518_1.jpg,/bh_c | |
| 75 | | | | |
| 76 | | | | |
| 77 | BH_3346,BH_3377 | BH_3105,BH_3100 | /bh_cycle_2536_1.jpg,/bh_c | |
| 78 | | | /bh_coast_1125_1.jpg,/bh_ | Finish:drop_down:1:0|Red:fixed:0:red:0|White:fixed:0:white:1|Black:fixed:0:black:2 |

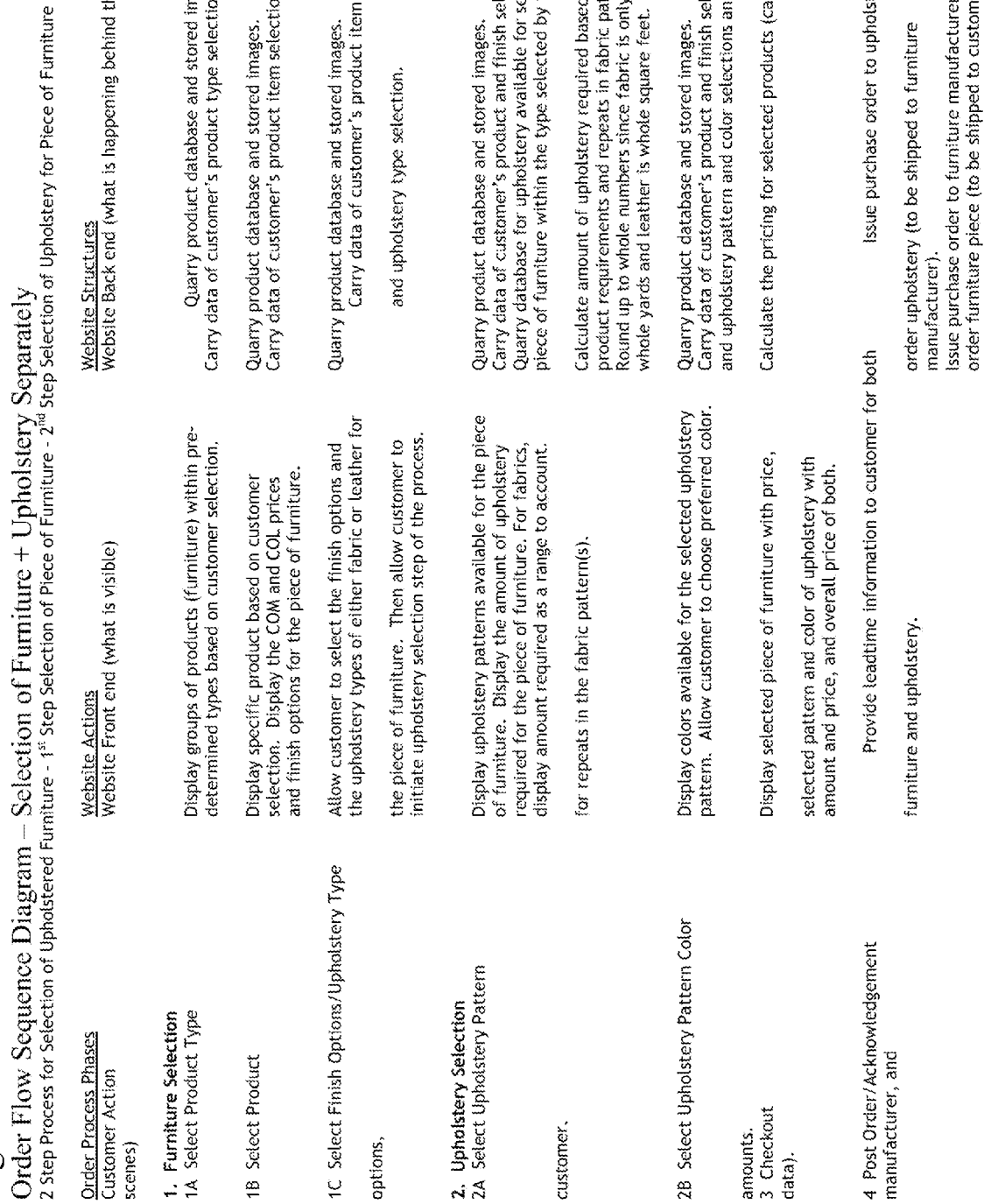

Fig. 4
Order Flow Sequence Diagram – Selection of Furniture + Upholstery Separately
2 Step Process for Selection of Upholstered Furniture - 1st Step Selection of Piece of Furniture - 2nd Step Selection of Upholstery for Piece of Furniture

| Order Process Phases<br>Customer Action | Website Actions<br>Website Front end (what is visible) | Website Structures<br>Website Back end (what is happening behind the scenes) |
|---|---|---|
| 1. Furniture Selection<br>1A Select Product Type | Display groups of products (furniture) within pre-determined types based on customer selection. | Quarry product database and stored images.<br>Carry data of customer's product type selection. |
| 1B Select Product | Display specific product based on customer selection. Display the COM and COL prices and finish options for the piece of furniture. | Quarry product database and stored images.<br>Carry data of customer's product item selection. |
| 1C Select Finish Options/Upholstery Type options, | Allow customer to select the finish options and the upholstery types of either fabric or leather for the piece of furniture. Then allow customer to initiate upholstery selection step of the process. | Quarry product database and stored images.<br>Carry data of customer's product item, finish and upholstery type selection. |
| 2. Upholstery Selection<br>2A Select Upholstery Pattern<br><br>customer. | Display upholstery patterns available for the piece of furniture. Display the amount of upholstery required for the piece of furniture. For fabrics, display amount required as a range to account<br><br>for repeats in the fabric pattern(s). | Quarry product database and stored images.<br>Carry data of customer's product and finish selections.<br>Quarry database for upholstery available for selected piece of furniture within the type selected by the<br><br>Calculate amount of upholstery required based on product requirements and repeats in fabric pattern. Round up to whole numbers since fabric is only sold whole yards and leather is whole square feet. |
| 2B Select Upholstery Pattern Color<br><br>amounts.<br>3 Checkout<br>data). | Display colors available for the selected upholstery pattern. Allow customer to choose preferred color.<br><br>Display selected piece of furniture with price,<br><br>selected pattern and color of upholstery with amount and price, and overall price of both. | Quarry product database and stored images.<br>Carry data of customer's product and finish selections and upholstery pattern and color selections and<br><br>Calculate the pricing for selected products (carried |
| 4 Post Order/Acknowledgement manufacturer, and | Provide leadtime information to customer for both<br><br>furniture and upholstery. | Issue purchase order to upholstery<br><br>order upholstery (to be shipped to furniture manufacturer).<br>Issue purchase order to furniture manufacturer and order furniture piece (to be shipped to customer). |

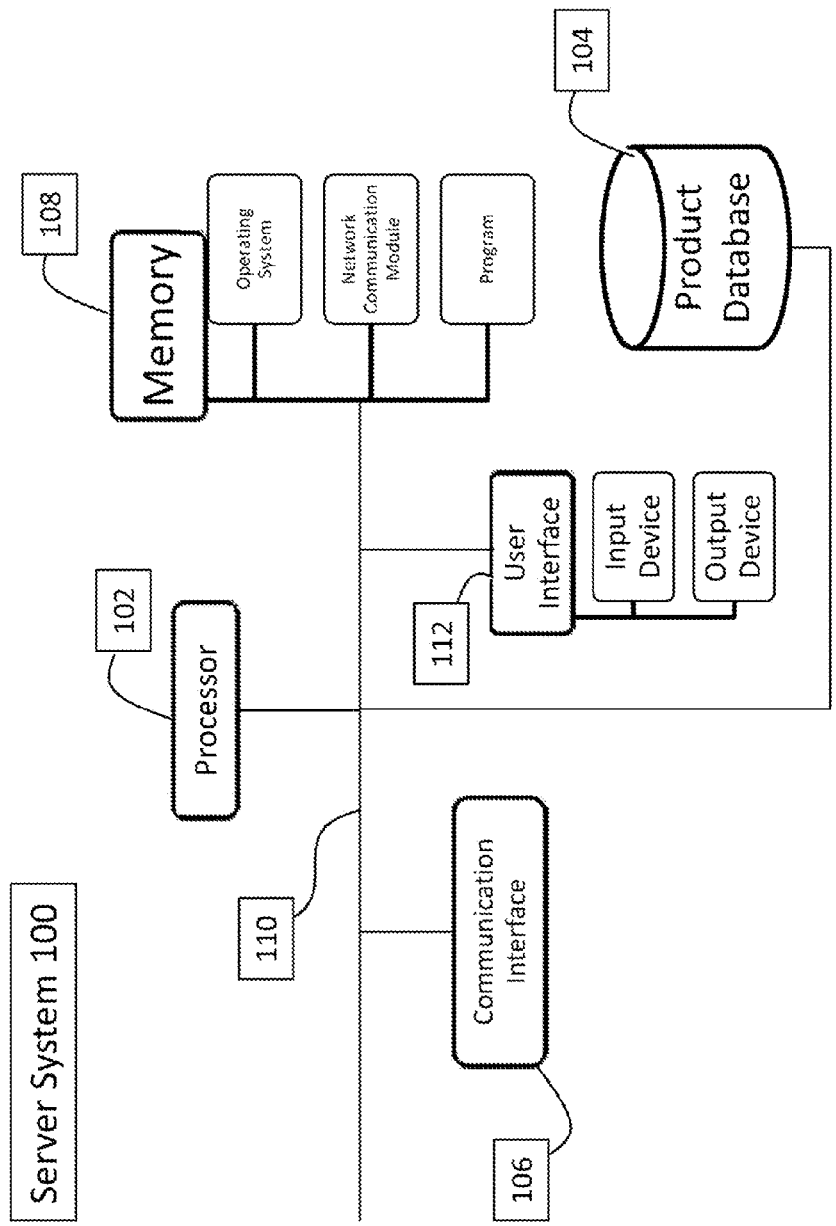

METHOD, MEDIUM, AND SYSTEM FOR ONLINE SELECTION AND ORDERING OF CUSTOM FURNITURE

RELATED APPLICATIONS

This application claims the benefit of U.S. Provisional Application No. 61/412,498 filed Nov. 11, 2010 entitled, "Methods for Online Selection and Ordering of Custom Furniture" by Shawn Gargiulo. The entire teachings of the above application(s) are incorporated herein by reference.

BACKGROUND OF THE INVENTION

Ordering custom upholstered furniture is often done in person because a number of decisions need to be made to process the order. For example, the customer often will choose the specific furniture piece. The selected furniture piece will many times have a specific set of available fabrics and leathers that can be used to upholster it. Based on the selected covering, the required amount of covering needed to upholster the furniture piece can vary depending on the covering type (e.g., fabric or leather), patterns in the fabric, hide inconsistencies, the amount of surface area needed to be covered, etc. Consequently, the selection of fabrics or leathers offered for a particular piece of furniture is often limited. In other cases in which a range of upholstery choices do exist, the overall process is complicated and often requires oral communication with the customer to obtain all the information needed to place the order.

Accordingly, a need exists for methods and systems for ordering custom upholstered furniture. A further need exists for providing such methods and systems to calculate the amount of fabric or leather needed to upholster a selected furniture piece, based on specific characteristics of the piece of furniture and the covering selected. Yet a further need exists to provide an online environment for ordering customized furniture so that a customer does not need to order such furniture in person.

SUMMARY OF THE INVENTION

The present invention relates to a method for ordering customized furniture. In a computer system, the method includes the steps of selecting a piece of furniture to be upholstered, wherein the selected furniture piece requires a covering and has a base amount (e.g., minimum amount) required for covering the selected furniture piece. The method further includes selecting a covering associated with the selected furniture piece, wherein the covering is associated with a fabric material having a fabric repeat size or a leather material having a hide inconsistency, to thereby obtain a selected covering. The method also includes the step of calculating a total amount of the selected covering needed to upholster the selected furniture piece, wherein the total amount of the selected covering is determined based on an additional covering amount related to the fabric repeat size of the fabric material or the hide inconsistency of the leather material, and the base amount of the required covering. The method also includes providing a display indicating the selected furniture piece, the selected covering, and the total amount of selected covering needed to upholster the selected furniture piece. In an aspect, the display can further indicate the cost of the selected furniture piece and the cost of the selected covering. The method also includes e.g., further displaying the additional amount of covering needed based on the fabric repeat size of the fabric material or the hide inconsistency of the leather material. In an embodiment, the methods include calculating the total amount of selected covering needed to upholster the selected furniture piece when the selected covering is leather material. This embodiment involves adding about 1 to about 5 square feet for every 50 square feet of the base amount needed for the required covering. In the case in which the selected covering is fabric material, the method further comprises adding an additional amount of fabric, based on a pattern repeat size, to the base amount needed for the required covering. The additional amount needed based on the fabric repeat size can be accomplished using a factor, a percentage, or a specific numerical amount. For example, for a pattern repeat size in a range between 0 and about 2 inches, the software calculates the additional amount of fabric to be about 0% or a factor of 0, a range between 3 and 10 calculates the additional amount to be about 10% or a factor of 1.1, a range between about 11 and about 20 inches calculates the additional amount to be about 15% or a factor of 1.15, a range between 21 and 25 inches calculates the additional amount to be about 20% or a factor of 1.2 and a range between 26 to 36 inches calculates the additional amount to be about 25% or a factor of 1.25. If the methods are using the percentage, then the percentage can be multiplied by the base amount needed and the product is added to the base amount to get the total amount of fabric needed to upholster the selected piece of furniture. In the case of the factor, the factor is multiplied by the base amount to get the total amount of fabric needed. In the case of a specific numerical amount, for example, a pattern repeat size in a range between 0 and about 2 inches, calculates the additional amount to be about 0 yards, a range between 3 and 10 calculates the additional amount to be about 1 yards, a range between about 11 and about 20 inches calculates the additional amount to be about 2 yards, a range between 21 and 25 inches calculates the additional amount to be about 3 yards and a range between 26 to 36 inches calculates the additional amount to be about 4 yards.

The present invention also pertains to a computer system for ordering customized furniture to carry out the steps described herein. The computer system includes at least one database (referred herein as "product database") for storing information associated with one or more furniture pieces to be upholstered, and information associated with one or more coverings for the furniture pieces, wherein each covering is a fabric material or a leather material, a base amount for the required covering, a fabric repeat size information for each fabric material. Also, the computer system includes at least one or more processors that is configured to execute or otherwise perform various instructions provided by the programs described herein. The computer system further includes at least one memory, which stores at least one program configured to interact with the customers and receive furniture selections and covering selections for the selected furniture piece. The program is also configured to determine the total amount of the selected covering required to upholster the selected furniture piece. The total amount covering is calculated by adding the base amount of the covering predefined for the selected furniture and the additional amount of covering determined from the repeat pattern size of fabric or the hide inconsistency of leather, depending on the covering type selected by the customer. In an embodiment, the total amount of covering needed to upholster the selected furniture piece is calculated by adding the base amount of the covering and the additional amount of the covering. The program is also configured to receive a selected covering associated with the selected furniture piece, wherein the covering is associated to a fabric material having a fabric repeat size or a leather material having a hide inconsistency, and calculate a total amount of selected covering needed to upholster the selected furniture piece, wherein the total amount of selected covering is determined based on an additional covering amount related to the fabric repeat size of the fabric material or the hide inconsistency of the leather material, and the base amount of the required covering. The program is also configured to provide a display on a client system, that comprises the selected furniture piece, the selected covering, and the total amount of selected covering needed to upholster the selected furniture piece. In an aspect, the display further comprises the price of the selected furniture piece and the price for the selected covering. The display can also comprise the additional amount of covering determined based on the selected fabric's repeat size or the selected leather's hide inconsistency. In yet another embodiment, the display shows the plurality of ranges that determines the additional amount of covering.

The present invention relates to methods and a computer apparatus for determining cost of shipping freight. In some embodiments, the database also stores a plurality of freight cost factors (e.g., two or more freight cost factors), wherein the freight cost factors include trip cost, per item cost, manufacture shipping cost, manufacturer surcharge, site condition cost, or a combination thereof. In one embodiment, the program is configured to ascertain amount of charges for two or more cost factors for the selected furniture piece and determine a freight shipping cost based on the amount of charges of the freight cost factors. In an embodiment, the program is configured to receive information about one or more site conditions from the customer and allocate predetermined charges for each of the site conditions received. In yet another embodiment, the program is configured to determine the amount of five freight cost factors and add the amount of the five freight costs factors to obtain a freight shipping cost. In another embodiment, the program is further configured to provide a display that presents the freight shipping cost. In yet another embodiment, the display can further present the shipping method to the customer.

The present invention includes a combination of any embodiments of the methods described herein, including for example, combining embodiments of ordering customized furniture and determining cost of shipping freight. Similarly, the present invention also relates to computer system that includes at least one program that contains instructions for ordering customized furniture as well as instructions for determining cost of shipping freight. Any combination of the methods, the computer system, and their embodiments described herein are encompassed by the present invention.

There are a number of advantages associated with the present invention. The present invention allows for a user to order customized furniture online. The methods of the present invention allow for calculation of the amount of fabric or leather needed to upholster furniture, based on the covering's characteristics such as pattern repeat sizes within the fabric or inconsistencies of leather hide. The present invention also provides easy, efficient, and highly customizable furniture ordering system by presenting covering options available for the customer's selected furniture piece. A user can now order customized upholstered furniture over the internet using a computer, rather than having to go in-person or call to order it. Additionally, the present invention provides a broader, more versatile selection for the consumer, is easy for a customer to place the order for customized, upholstered furniture and simpler for an administrator to manage the software that runs the website.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A-1Z provide a sample database table showing the following datafields: store, websites, attribute_set, config_attributes, type, sku, category_ids, has_options, name, url_key, gift_message_available, meta_title, meta_description, thumbnail, small_image, image, custom_design, options_container, leather_origin, url_path, fabric_dimensions, warranty_period, weight, price, description, meta_keyword, short_description, custom_layout_update, sustainability_info, technical_info, warranty_info, status, tax_class_id, visibility, enable_googlecheckout, leather_manufacturer, leather_texture, color, fabric_measure_type, shipping_method, use_config, pdf_name, sample_sku, hi_resolution_image, leather catalog, manufacturer_information_detail, required_options, leather_price, textile_literature, textile_origin, textile_designer, textile_repeat, textile_durability, textile_category, textile_catalog, textile_fiber_content, designer_info, textile_manufacturer, textile_pattern, thumbnail_label, small_image_label, image_label, fabric_price, furniture_origin, fabric_required, leather_required, furniture_leadtime, furniture_category, furniture_catalog, furniture_leatime, furniture_fabric_price, delivery_charge, furniture_fabric_price, dimension, product description, furniture_manufacturer, furniture_designer, furniture_style, furniture_room, furniture_covering, covering_selection, materials, price_no_covering, news_from_date, news_to_date, associated, related, associated options, image_exclude, small_image_exclude, thumbnail_exclude, hi_resolution_image_exclude, covering_sku_fabric, covering_sku_leather, gallery, and custom_options_attributes.

FIG. 4 is a schematic showing flow diagram illustrating steps and system processes of an embodiment of the present invention.

FIG. 5 is a schematic showing a flow diagram of server system 100 to carry out the steps of the present invention.

DETAILED DESCRIPTION OF THE INVENTION

Figure 2A:
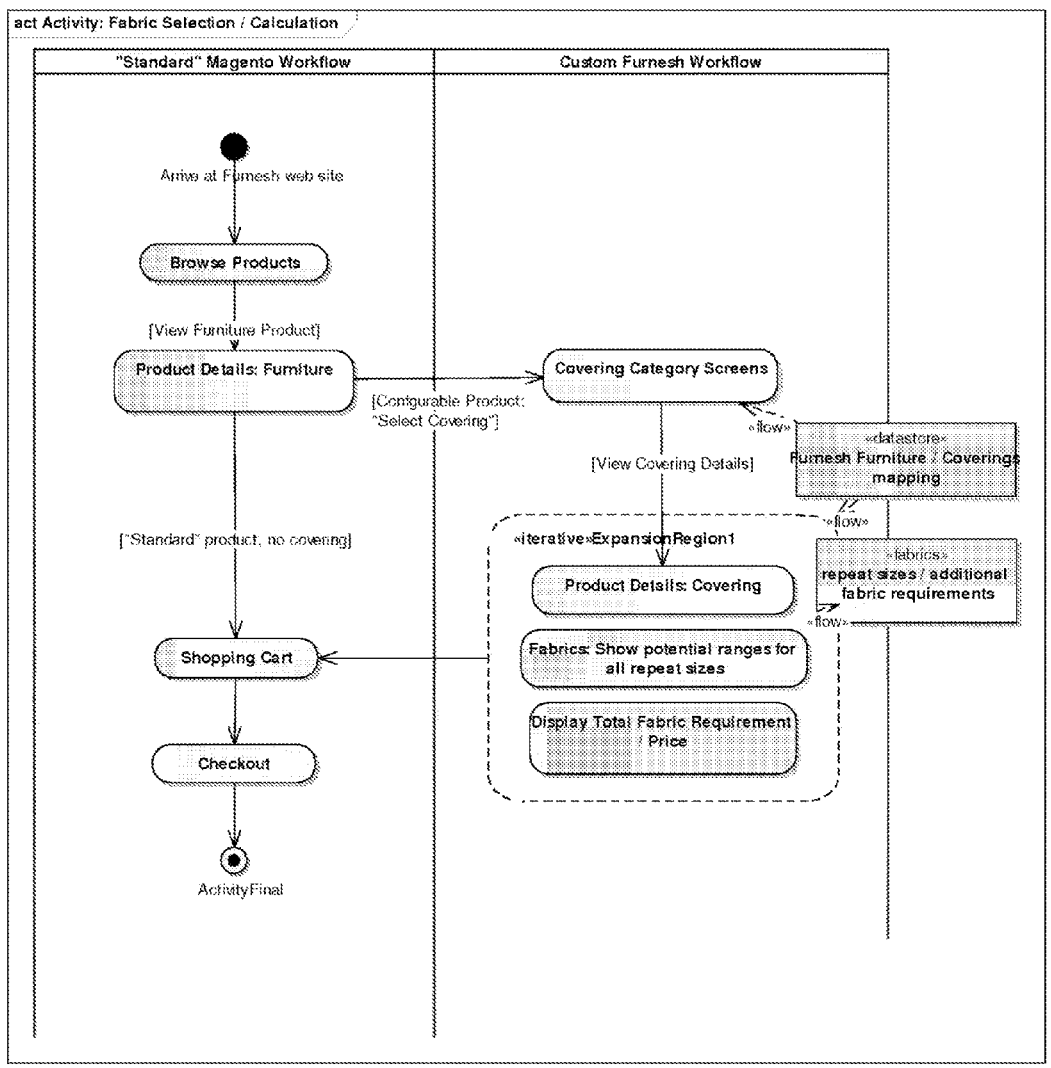
FIG. 2A is a schematic of a flow chart showing the overall fabric selection process.

A description of preferred embodiments of the invention follows.

Generally, furniture and fabric/leather for covering furniture are not made at the same site. Upholstery (e.g., fabric/leather) is often made at one company (e.g., by a mill or a tannery) and shipped to furniture factories where the upholstery is used to upholster furniture. These separate companies work together to produce customized, upholstered furniture. The existence of numerous mills, tanneries and furniture factories results in an infinite number of possible furniture and upholstery combinations.

Since the furniture industry is generally based on a built to order model, most customized items are tailor made, and not stocked. Unlike other industries, a customer can order a single piece of furniture in the upholstery (e.g., covering) of the customer's choosing.

Furniture manufacturers many times sell upholstered furniture either as Customers Own Material (COM)/Customers Own Leather (COL) or as Graded. COM refers to upholstery using fabric, whereas COL refers to the use of leather. Since furniture manufacturers will make their upholstered furniture in almost any fabric or leather, the customer can send fabric/leather to the furniture manufacturer and they in turn will make the chosen piece of upholstered furniture in the fabric/leather that the customer sent them. The COM/COL price of the piece of upholstered furniture is essentially the price for the furniture less the cost of upholstery. Graded refers to a pricing model where the cost of the upholstery is added to the cost of the piece of furniture.

Furniture manufacturers can sometimes partner with a separate fabric mill/leather tannery and offer that company's upholstery on their furniture. Since fabrics/leathers vary in price, the higher the cost of the upholstery the higher the price for the piece of furniture (e.g., referred to as a higher Grade, the higher the grade the higher the overall cost). There are also some cases where larger companies own furniture factories, fabric mills and leather tanneries and offer their own upholstery on their own furniture in a Graded pricing structure.

To summarize, "COM/COL" refers to a furniture pricing model that does not include the cost of upholstery, whereas "graded" refers to a furniture pricing model includes the cost of upholstery. With COM/COL there is a single price for the piece of furniture in fabric and a single price for the piece of furniture in leather. With the graded pricing model, there are many prices for the furniture based on the grade of the upholstery.

The present invention relates to an online store that provides the consumer the broad selection of products and is still easy to use. The present invention is the first online environment to utilize the COM/COL approach and solve the problems of calculating the proper amount of fabric or leather needed for the selected furniture piece that the user desires without having to physically go to a store or call a store to order it. Utilizing the COM/COL model, the present invention accounts for and calculates a number of variables to allow this process to occur online and provides a price for the covering and a separate price for the piece of furniture to be upholstered.

In particular, the present invention relates to computer implemented methods and computer systems for selecting and procuring custom upholstered furniture. Ordering customized furniture online can be problematic because a number of variables affect the final product. Variables involved in the online ordering of customized furniture include fabric selection, the surface area of the selected furniture to be covered/upholstered, the amount of fabric or leather needed, the size and patterns in the fabric, the number of repeat patterns in the fabric, the cost of the fabric, the cost of shipping, and the like. As a result, creating and ordering custom furniture online either had limited options, or was simply not possible and required the shopper to call or personally go to the store.

Figure 1N:
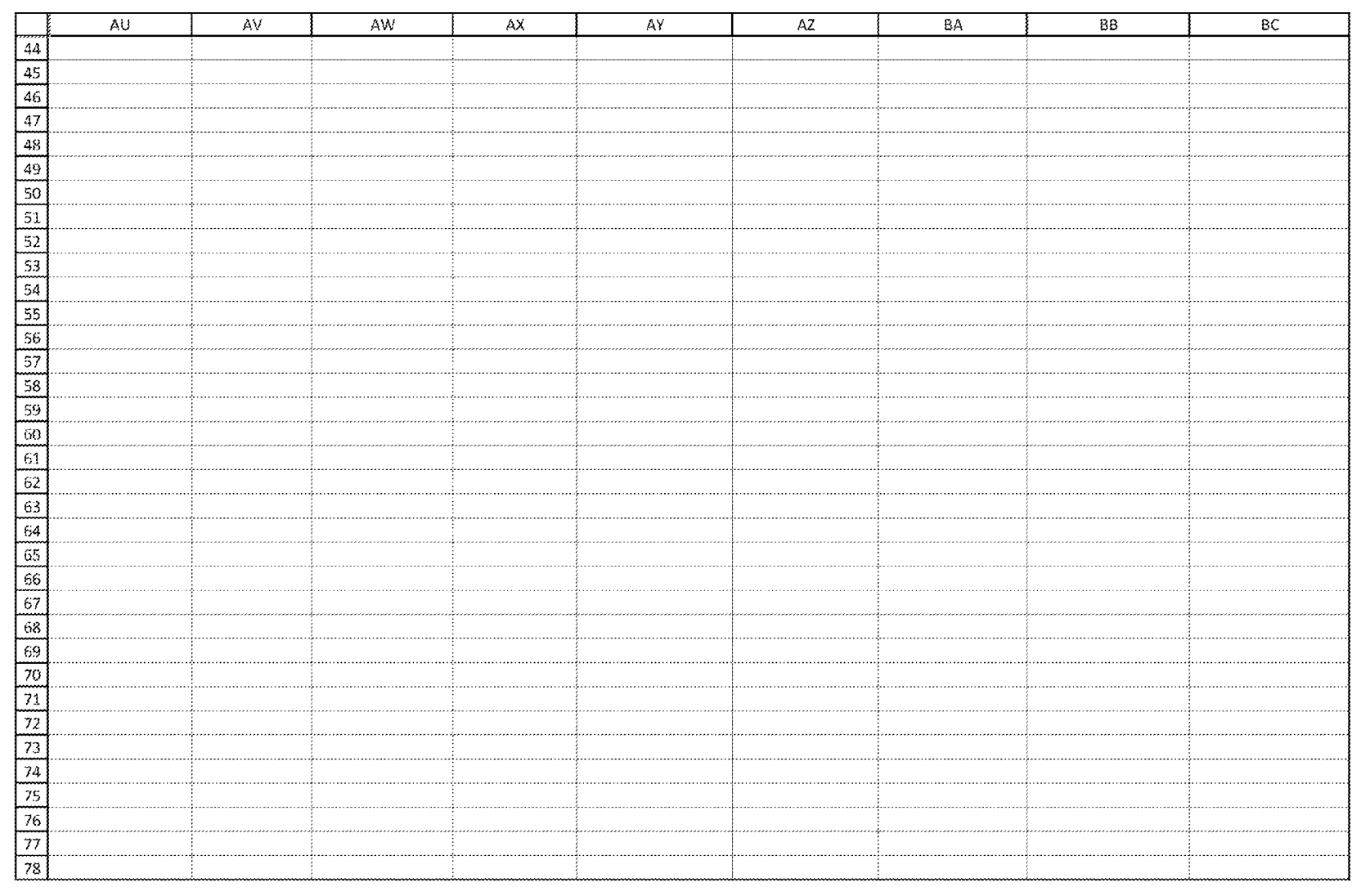

The present invention relates to methods in a computer system for selecting a furniture piece and its corresponding covering to customize furniture. The methods described herein pertain to calculating the total amount and total cost of the selected covering required to upholster the selected furniture piece, and to determine the cost of shipping and delivery. The information about the furniture pieces and the coverings are stored in a database, a sample of which is shown in FIGS. 1A-Z. The present invention utilizes methods and systems to allow for efficient and accurate calculations so that costs and amounts of customized coverings for a desired furniture piece can be efficiently designed and ordered online.

Generally, the present invention relates to methods for selecting a covering for a particular furniture piece. The systems and methods of the present invention allow the customer to select the type of covering for the selected piece of furniture being purchased. The methods begin with the user browsing and choosing a furniture piece, and based on the furniture selected, choosing the covering type (e.g., leather or fabric). Based on the covering type, the user goes to a covering category screen and chooses the specific covering within the selected covering type. The steps of the present invention include calculating the amount and cost of the covering chosen to accommodate the selected furniture piece and pattern repeat size of the fabric. Details of the products can be provided along with amounts of fabric or leather needed based on the fabric pattern's repeat size and other variables. The amount for the selected fabric or leather is shown and the user proceeds to the shopping cart screen to purchase the selected furniture and the covering for it. An overview of the process is shown in the schematic in FIG. 2A and FIG. 2O.

Figure 1P:
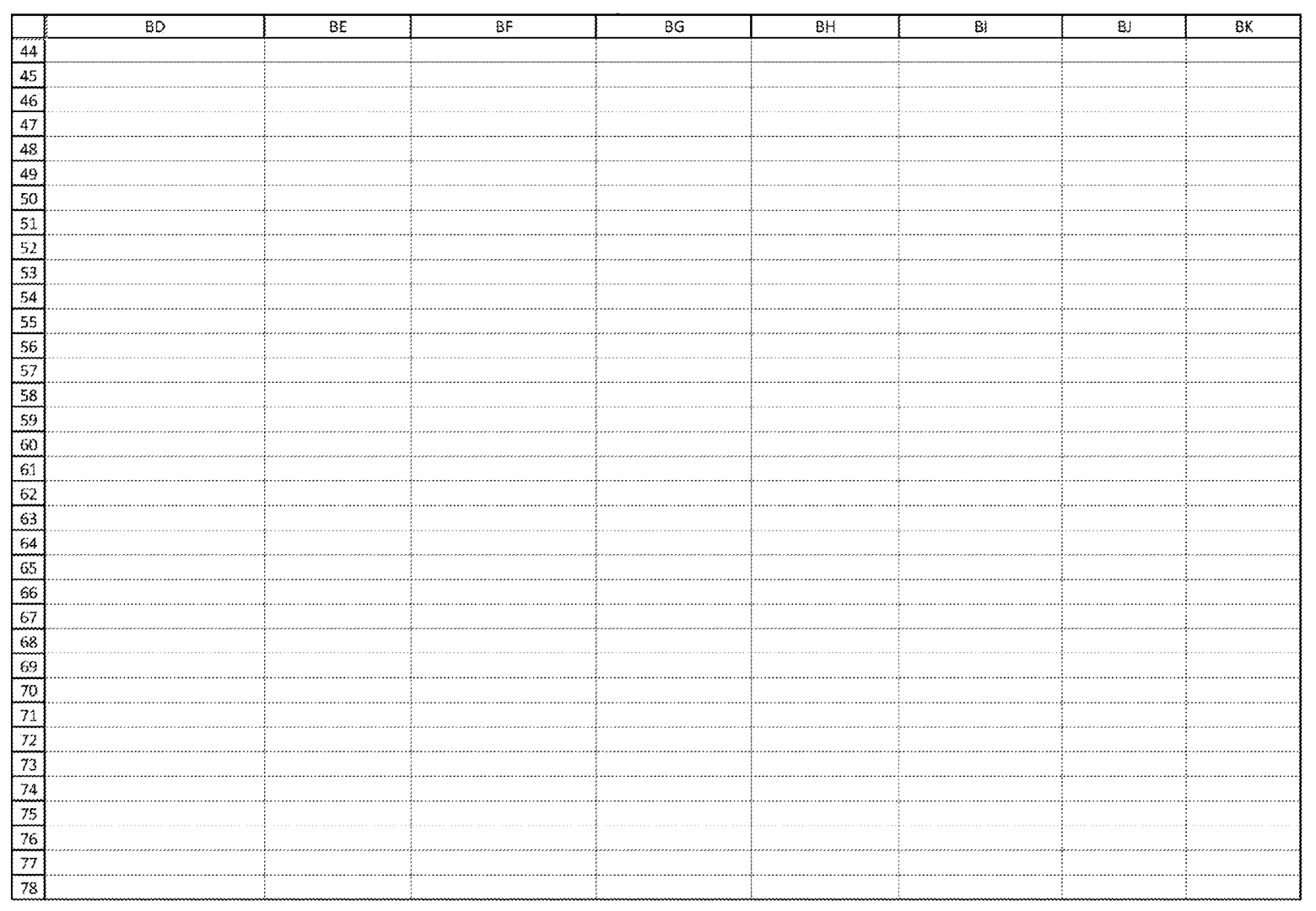

The methods and computer system of the present invention utilize a database (e.g., domain) that stores information for carrying out the methods described herein. As used herein, a "database" is a collection of two or more pieces of stored data in predetermined data index architecture. Data can be stored and indexed in a manner, and in a mode known in the art, or developed in the future. Examples of types of databases that store data and links described herein include MY SQL, SQL, and Oracle. The data can be stored physically together, or associated with one another. The database used in the present invention contains datafields related to customizing furniture and include, for example, store name, websites of store, attribute of the data record (e.g., leather, fabric, furniture, etc), type of item, sku, category, options, links, gift messaging, descriptions, thumbnail/images links, predetermined custom design options, container options, information about the upholstery type including upholstery origin, dimensions, repeat size and occurrence, warranty information, weight, price, description, manufacturer information, color, texture, measurements, price, options, designer information, delivery time, shipping methods, furniture style, material type, and other related information. Any information related to furniture, upholstery, sizing, weight, fabric repeats and the like can be stored in such a database. A sample database is shown in FIG. 1. FIG. 1 contains only a limited number of datafields, records and datapoints by way of example and is not intended to represent a full set of data or be limiting in any way. In some embodiments, data or datasets described herein can be implemented in separate databases using multiple servers so as to improve reliability or other factors.

Selecting the Furniture:

The methods of the present invention begin with the user choosing the type of furniture to be purchased. See FIG. 4, step 1B. The types of furniture include any furniture that can be upholstered. For example, the present invention includes calculating and customizing furniture including seating (e.g., sofas, chairs, lounges, chaise, benches/ottomans, stools, outdoor seating, and sectionals), storage, bedding, tables, desks, etc. Furniture can be sorted in any number of ways to accommodate the user and includes categories such as style type (e.g., contemporary, modern, transitional and traditional), use (e.g., seating, storage, sleeping, office, etc), price point (e.g., $0-1000, $1001-2000, etc), furniture class (e.g., chairs, tables, beds, ottomans, etc.), application (e.g., living room, bedroom, etc) and the like. See FIG. 4, step 1A. In an embodiment, the furniture can also be sorted by available fabric options. Accordingly, if a user has a piece of furniture upholstered with a specific material and wanted to buy additional customized pieces with the same material, then the user can sort for furniture pieces that utilize the specific material of the covering. The methods of the present invention provide an output display to the customer, which presents indicia as to the amount of fabric or leather required to upholster the furniture. See FIG. 4, step 1C. Additionally, the display can include other information about the selected furniture piece, such as cost, name, photos/views of furniture, dimensions, warranty information, manufacturer, location of manufacturer, lead time, and any other information about the selected furniture piece.

When the user chooses the desired piece of furniture to customize, then the methods of the present invention provide information from the database (also referred to as a "product database") to indicate if a covering is needed and if so, what covering types are available. See FIG. 4, step 2A. Examples of types of coverings include leather, fabric, and the like. Referring to the example database structure shown in FIG. 1, furniture pieces with the "config_attributes" datafield (e.g., column) set to "furniture_covering" provides the user of a choice of covering types. If the piece of furniture selected cannot be upholstered, or upholstery is not needed, then the methods of the present invention generate an output in which the user can simply purchase the selected furniture piece. When covering selection is not needed for the selected furniture piece, the display will simply present an "add to cart" or similar button that will allow the user to proceed with the purchase.

However in the event that the selected furniture piece is one that can be upholstered (e.g., has the attribute_set defined as furniture, config_attributes defined as furniture_covering, type set to configurable in FIG. 1), then the methods generate a display configured to begin the covering selection process. In some embodiments, the user can click on the "Select Upholstery" button to select a covering.

When the customer selects a piece of furniture, the customer is redirected to a page. The methods of the present invention allow the user to choose the type of covering with which the furniture will be customized/upholstered. In an embodiment, the covering types include "leather" or "fabric".

For example, a customer chooses to purchase a chair and chooses leather as the type of covering. In the example database shown in FIG. 1, the data column labeled "furniture_covering" contains the available options, leather or fabric for the corresponding furniture pieces. Once the customer chooses the furniture and the covering type (e.g., as identified by the "covering_selection" data column), the customer can click a 'Select Upholstery' button instead of an "Add to Cart" button. In certain cases in which the furniture piece includes wood finish options, the type of wood finish can be chosen by the customer before clicking on "Select Upholstery" button. In the sample database of FIG. 1, the column or datafield labeled "furniture_covering" contains the available options, leather or fabric for the selected furniture pieces. During this process, certain session variables/data are set in the session and information is carried on to the next page until the customer customized furniture is entered into the cart or the customer ends the session (e.g., logging out of the site or closing the browser). An example of such parameter or session variable include, the customer's covering type selection. In this case, the choice is either leather or fabric, stored in "covering_type" of a session array. The session variables, arrays and tables, can reference other datafields stored in other session variables, arrays and tables, as well as datafields in the product database (e.g., domain). As will be discussed further, additional session variables/data maintained during the session include, the customer's selection for furniture, covering selection, additional amount determined from the characteristics of covering, base amount of fabric or leather, and the like.

In an example, the customer can choose the covering type from the dropdown menu and then select the 'Select Upholstery' button when purchasing a piece of furniture that needs a covering. When this button is clicked, the piece of furniture is to be added to the cart and the user is sent to the fabric or leather category page, as described further herein. When the user is redirected to the fabric or leather category page, session variable information including product information such as the product SKU is stored in a table with a variable indicating that the covering for the corresponding product SKU (e.g., the selected furniture piece) has not yet been selected. In an embodiment, the table described above can be created during the process to store various session data including: "ukid," "order_id," "product_sku," "fabric_sku," and "leather_sku." In an embodiment, "ukid" is a primary key of the table, e.g., an auto-incrementing integer to uniquely identify each row or data record.

In the event that the user selects the fabric covering option, the selected furniture piece is added to the cart and the customer is redirected to the fabric category page configured to present fabric covering selections available for the selected furniture piece. In embodiments of the present invention, certain pieces of data are saved in the session and passed from page to page during the fabric selection process. Session variables that can be set and passed on during the session include, for example, amount of fabric needed (e.g., "fabric required" datafield), the unit of measure used (e.g., "yards" or "meters"), an identifier for the furniture piece/product selected (e.g., SKU), and the path of the furniture in the category hierarchy (e.g., seating>lounge). Additional session variables can be temporarily stored for the session as needed. Other examples of such session variables include any information and data described herein such as the price for the piece of furniture with fabric covering, the fabric coverings that are available for the piece of furniture, the finish options for the piece of furniture as well as other information. In this particular example, session variables/data that carry over to the next page include the amount of fabric needed along with the unit of measure, in this case "yards," and the user's covering choice. The choice of covering, namely fabric, will redirect the user to the fabric category page, which is further described herein.

When the user selects the leather covering type, then the selected furniture piece is added the cart and the user is redirected to the leather category page. Certain session variables, in an aspect, can be saved during the session and passed on from page to page until the customer finalizes the covering selection or finalizes the purchasing of the items stored in the cart. Examples of such session variables that can be set in this fashion include the unit of measure used (e.g., "square feet"), product information or identifiers (e.g., a product SKU), the path of the furniture in the category hierarchy (e.g., seating>lounge), and the minimum amount of leather needed to upholster the selected furniture piece. Additional session variables can be temporarily stored for the session as needed. Other examples of such session variables include any information and data described herein such as the price for the piece of furniture with leather covering, the leather coverings that are available for the piece of furniture, the finish options for the piece of furniture as well as other information. The figure shows that certain data are saved in session variables/data, session arrays, session tables, and/or other any other data format, to be carried throughout the steps/methods described herein. Such data include, for example, the amount of leather (e.g., 30) and the unit of measure (e.g., square feet) required for the selected furniture piece. The user's choice of "leather" will redirect the user to the leather category page, which is further described herein.

Such session variables, in an embodiment, are only maintained while the user is navigating through the pages configured for the selected covering. In an embodiment, if the user navigates out of the leather or fabric area, the some or all session variables are cleared.

When the user is on either the fabric or leather covering selection page during the covering selection process, general covering selection information can be displayed. This data, in an embodiment, is shown when the user is choosing a covering specifically for a furniture piece. In the event that the user is purchasing fabric or leather that is not associated with a particular furniture piece, then the general covering selection information does not show.

Clicking on the "Select Upholstery" button will save the furniture piece to the cart and then redirect the customer to the covering selection page of the corresponding covering type. When Leather is Chosen:

The program described herein then matches the upholstery type selection with the database options available for leather and provides the user an output of options. In the example, the program generates a query for retrieving coverings available for the selected furniture piece within the user's chosen fabric option (e.g., data field referred to in the database as "attribute_set"). In this case, the data records having a "leather" match include the "finesse" leather and "fundamental" leather options, and so the program provides a display to the user presenting two leather covering options.

Clicking on the "Select Fabric Upholstery" button will save the furniture piece to the cart and then take the user to the category page of the covering type. In this example, the software can go to the leather category page because the user previously chose leather covering. The user can then navigate the covering selection pages through the associated sub-categories of leather options until the user finds the desired covering. See FIG. 4, step 2A. Only available upholsteries for the selected furniture piece and upholstery (e.g., covering) type are shown. In an embodiment, the program of the present invention generates a query, selecting the specified furniture piece and the specified covering type to get available coverings for said combination. For a piece of furniture the website displays the leathers listed in the "covering_sku_leather" field (e.g., column CO of FIG. 1) for that piece. For example, options shown in this page are those that, referring to FIG. 1, have data columns such as "attribute_set" set to "leathers", "covering_selection" set to "leather" and include associated available leathers listed in "covering_sku_leather". Leather options are available because the selected furniture piece has a datafield referred to as "furniture_covering" set to "leather." When the user selects the leather covering, the user is redirected to a webpage that shows the color and texture options for the selected covering. See FIG. 4, step 2B. The user selects "Finesse, Bernhardt" and goes to the screen output.

In response to the customer selecting the desired covering, the user is redirected to product detail page of the selected covering. The user can choose the desired leather and/or fabric options and when clicking on the leather or fabric options, information about the leather/fabric choice is displayed. The product detail page contains any information about the leather or fabric option can be retrieved from the product database described herein. Examples of such information include color, manufacturer, cost of the fabric/leather per unit, lead delivery time, warranty information, unit of measure, required amount of fabric, cost of the fabric/leather for the selected furniture piece, and the like. In an embodiment, when selecting a leather option, the amount of leather required for the selected furniture is displayed. Such information is gathered the methods and algorithm that are further described herein. In an embodiment, basic information about the selected furniture piece can also be displayed. For example, the required amount of leather (e.g., 30), the unit of measure (e.g., square feet), and product description can be displayed along with the available leather coverings. Such information can be retrieved from the database shown in FIG. 1 using, for example, the session variable "product_sku" in the session table created when the user selected the furniture piece to be customized.

The covering choices can be sorted in any fashion. The leather assortments can be sorted by price point, manufacturer, etc. When the user clicks on a particular leather choice, the customer is redirected to a product detail page of the selected covering. The program of the present invention provides a display showing information about the selected covering, for example, the name of the covering, reviews, cost per square foot, and available colors. Note that the session data (e.g., required amount of leather for the selected furniture, unit of measure and chosen leather/leather color) are carried over this page as well. If the selected covering has a plurality of color options, the customer is provided with a list of available colors. When selecting a leather or fabric choice, the required amount and price information is gathered using the functions built into the fabric calculation functionality further described herein. The total amount of fabric or leather required for the selected furniture determined based on the characteristics of the selected covering (e.g., pattern repeat size, hide inconsistency), as well as the total price of the selected covering can be displayed during the selection process. The user can decide on available options (e.g., color) and finalize the selection. Finalizing the covering selection can be done by clicking a designated button, such as the "Add to Order" button, and the selected covering for the furniture will be added to the cart. The methods of the present invention involve adding the fabric or leather into the cart. The additional session variables/data (e.g., "fabric_sku" or "leather_sku") can be generated or otherwise recorded in a session table prepared for "cart" page. Further, in some embodiments, some session variables/data used during the covering selection process can be cleared.

Sometimes, a customer might initiate checkout process without selecting a covering for the selected furniture. Accordingly, in some embodiments, the program of the present invention can be configured to automatically check if any furniture piece in the cart is missing covering selection. If there is, the program can prompt the customer to select a covering or remove the furniture before initiating the checkout process. Further, a link to the covering selection page for the particular furniture piece can be provided to guide the customer.

When Fabric is Chosen:

In one example the customization process covering option is "fabric" instead of "leather." Fabric materials and leather materials have different characteristic. Therefore some embodiments of the present invention can vary depending on the covering type selected by the customer. In the case in which the covering option is fabric, additional variables are calculated to determine cost and amount of fabric needed for the selected piece of furniture. Those variables are related to the pattern repeat in the fabric. For example, the process of determining the total cost and the total amount for fabric utilizes the pattern repeat size of the fabric. Specifically, the amount of fabric needed for upholstering furniture can vary depending, for example, on the size of the repeats, the number of repeats in a specific length and/or width, the size of the selected furniture piece, and size of raw fabric/bolt.

In another example, the user may choose the same piece of furniture as in the example above, a Bernhardt B4 Chair, and has chosen the fabric covering option, instead of the leather covering option. The information and steps described herein apply only to differences as they relate to the fabric choice. As shown herein, the user is presented with an option to select the wood finish of the selected furniture. Such option is associated with the selected furniture piece. In response to the customer selecting fabric as the covering, the customer is presented with an interactive display showing available fabric choices for the selected furniture. The software of the present invention indicates the amount of fabric required to upholster the selected furniture. In this case, the selected chair requires 3-5 yards of fabric, which is the range determined from the size of pattern repeats.

Two choices of fabrics are provided for the selected furniture: Bark and Asteroids. See FIG. 4, step 2A. Similar to the examples of leather selection page, the user can sort the presented in fabric choices by price, manufacturer, pattern style/size, and the like. Referring to the sample database shown in FIG. 1, several data columns relating to for these fabric options/coverings are shown. The information of the database includes, in an embodiment, the following datapoints relating to the fabric amount and/or fabric price calculation: dimensions, weight, price, description of the fabric, material fabric is made from, number of repeats per dimension, amount of fabric need to cover the selected furniture piece. In this example database, the "textile_repeat" data column contains a plurality of pattern repeat size values for corresponding fabrics. A pattern repeat is a pattern found within the fabric that is repeated more than once. The pattern repeat size used herein refers to the dimension or size of a single pattern within the repeat. Using the methods described herein, the program of the present invention calculates the amount and cost of the fabric needed to cover the selected furniture piece.

The amount of fabric needed for the selected furniture based on the pattern repeat size, along with other detailed product information. The detailed product information provided on the display can include, for example, origin of the fabric, designer of the fabric, fiber contents, durability, as well as pattern repeat size. The display can also be configured to show the unit price as well as the total cost of the selected fabric, needed for the selected furniture piece. For the "Asteroids" fabric selection, there are three color options, each requiring 4 yard of fabric at $62/yard, totaling $248 for the amount needed for upholstering the selected furniture. See FIG. 4, step 2B.

Any fabric or leather can be used with the selected furniture piece so long it is suitable for upholstering the selected furniture piece. Examples of fabrics materials include cotton, acrylic, polyester, wool, and blends thereof. Other fabrics that are known or developed in the future can be used so long as they are suitable for upholstering. Other pieces of furniture that are known or developed in the future can be upholstered in new or existing fabric and leather options.

After selecting the desired fabric color, the user can finalize the fabric selection by pressing the "Add to Order" button. When the customer clicks on the "Add to Order" button, the determined quantity/amount of the selected fabric is added to the cart.

Throughout the process, customized screens are used to administer the tables used in the methods of the present invention. Sub-options can be created to display information from the tables e.g., that include the associated fabric options, leather options and the like. Each fabric pattern comes in several different colorways (e.g., a scheme of two or more colors in which a design is available). Once the user has selected a particular fabric pattern, they then select the desired colorway of that pattern. The colorways of each pattern are listed as individual rows in the database. For each fabric pattern there is one row for the item with the 'Type' value set to configurable and then one row for each colorway for the item with the 'Type' value set to simple. In an embodiment, the simple rows are connected to the configurable row in the listings of the "Associated" field in column CG. Options have an "attribute_set" to "textiles" and are "associated" (column CG) colorways to the selected fabric pattern. Fabric options are available because the selected furniture piece has a datafield referred to as "furniture_covering" set to "fabric."

In an embodiment, when the user clicks on the "Fabric" Tab, a menu of allowed coverings is provided. The user can sort the allowed covering options in any fashion. Sorting can be done e.g., by category, pattern, color, price, quantity, style, and the like. The methods of the present invention include providing the user a screen display that includes a listing of the available coverings and information about the covering including e.g., the product description, the product SKUs, fiber content, durability, origin of product, etc.

Shopping Cart:

After successfully selecting the desired furniture piece and the covering for the selected furniture, the user can be presented with a "shopping cart" page. Any information that relates to the chosen furniture piece and/or covering can be provided in this display. In aspect, the "Shopping Cart" page shows the selected furniture and the selected covering as two separate items. The selected furniture is listed as a single item with its description, unit price, quantity and the total price. The selected covering (e.g., "Asteroids 3346") is listed as a separate item with its description, unit price, quantity for the selected piece of furniture, and the total fabric price. See FIG. 4, step 3. However, each furniture piece and the associated covering (e.g., covering added for the furniture) should be displayed in a pair, so that each pair can be distinguished from another pair.

As mentioned, some embodiments of the present invention automatically calculate the required amount of covering needed for the selected furniture, and can be configured to populate the quantity field in the cart. In some other embodiments, users can manually enter or modify the auto-populated quantity value. For instance, the customer can manually enter a new value in the "QTY" field and press the "Update QTY" button, which will automatically update the "Grand Total" amount. The order process is finalized when the user presses the "Proceed to Checkout" button, and pays for the customized furniture piece, which includes the selected furniture customized with the chosen fabric. See FIG. 4, step 4. The table created herein can be used to facilitate adding the selected furniture piece and associated covering to the cart. In an embodiment, if a furniture piece does not have an associated covering and requires one, the methods of the invention will allow the user to select a covering by having a 'Select Upholstery' button next to the furniture piece. In some embodiments, the customer will not be allowed to checkout until each furniture piece requiring covering selection has an associated covering added to the cart. In an embodiment, a button or a link can be provided in the "Shopping Cart" page to redirect the customer back to the covering selection page. In this case, a new session table and session data can be created, and the selection process can be the same as described above. Furthermore, the system described herein can be configured to allow the customer to checkout if the furniture in the cart does not require a covering; then the software will simply allow the furniture piece to be listed long with cost and will allow the user to check out and pay for the furniture.

In an embodiment, the program of the present invention allows an administrator to administer the database like that shown in FIG. 1 and other tables. The administrator can customize certain options and add, remove or modify information. For example, the administrator can have the option to add, edit or delete a record of allowed coverings from this screen. Deleting a record removes all records from the table with that associated product. Adding or editing a record should take the administrator to a second screen that contains two tabs, a "Product Info" tab and an "Associated Covering" tab. In the product information screen the administrator enters/modifies the product SKU number and vendor ID. In the associated coverings screen, the administrator can add records (or delete or modify existing records) specifying a leather or fabric SKU and whether or not it is a leather or fabric. This functionality allows the database to be maintained as new fabric coverings and furniture pieces are made or come on the market.

Sequence diagrams illustrate how the data is retrieved from the database and transferred from one page to another during the furniture selection process and the covering type selection process, according to some embodiments of the present invention. A customer selects a furniture piece to customize. Using the selected furniture's "product_id" additional information associated with the selected furniture is retrieved from the database. For example, data values of "fabric_required", "url_key", "sku", as well as other values are retrieved from the database. The retrieved values can be stored in a "session array" for each product, having a plurality of "keys" (e.g., "fabric_required", "measured_type", "url_key", "product_sku", "product_id", "covering_type", "category_id", "item_id", "qty"). Each key of the array corresponds to the values specified. As mentioned above, some data needs to be transferred over from one page to another to provide sub-options or to carry out the process of other processes described herein. Also, some data values need to be retained as long as the customer is active in the site. For example, data values associated with the cart (e.g., items stored in the cart, quantity) must be kept until customer proceeds to checkout or ends the session otherwise. Therefore, session array is used to retain the associated session variables/data throughout the covering selection process. Once the data is retrieved from the product database for the selected furniture piece, the customer is redirected to the next page to select the covering material for the selected furniture. The key "covering_type" has value "Fabric" and "Leather", which indicates that both materials are available for the selected furniture. Once the customer selects the covering material, the selected value is stored as a session variable/data (e.g., "fabric_selection_variable") and the customer is redirected to the corresponding page for further selection. In an embodiment, an additional session variable (e.g., "fabric_selection_breadscumbs") can be created to override the breadscumbs when the customer is redirected to the covering selection page.

A diagram illustrates how the data is retrieved from the product database and transferred from one page to another during the covering type selection process and the covering selection process, according to some embodiments of the present invention. Assuming the customer selected "Fabric" in the previous page, the "Fabric_selection_variable" would be transferred to the next page for selection of the covering. Likewise, the session array and the data elements stored therein would also be transferred to the page for selecting the covering. Using the covering selection data (e.g., "fabric_selection_variable") carried over from the covering material selection page, the program obtains fabric selections available for the selected furniture.

Figure 3:
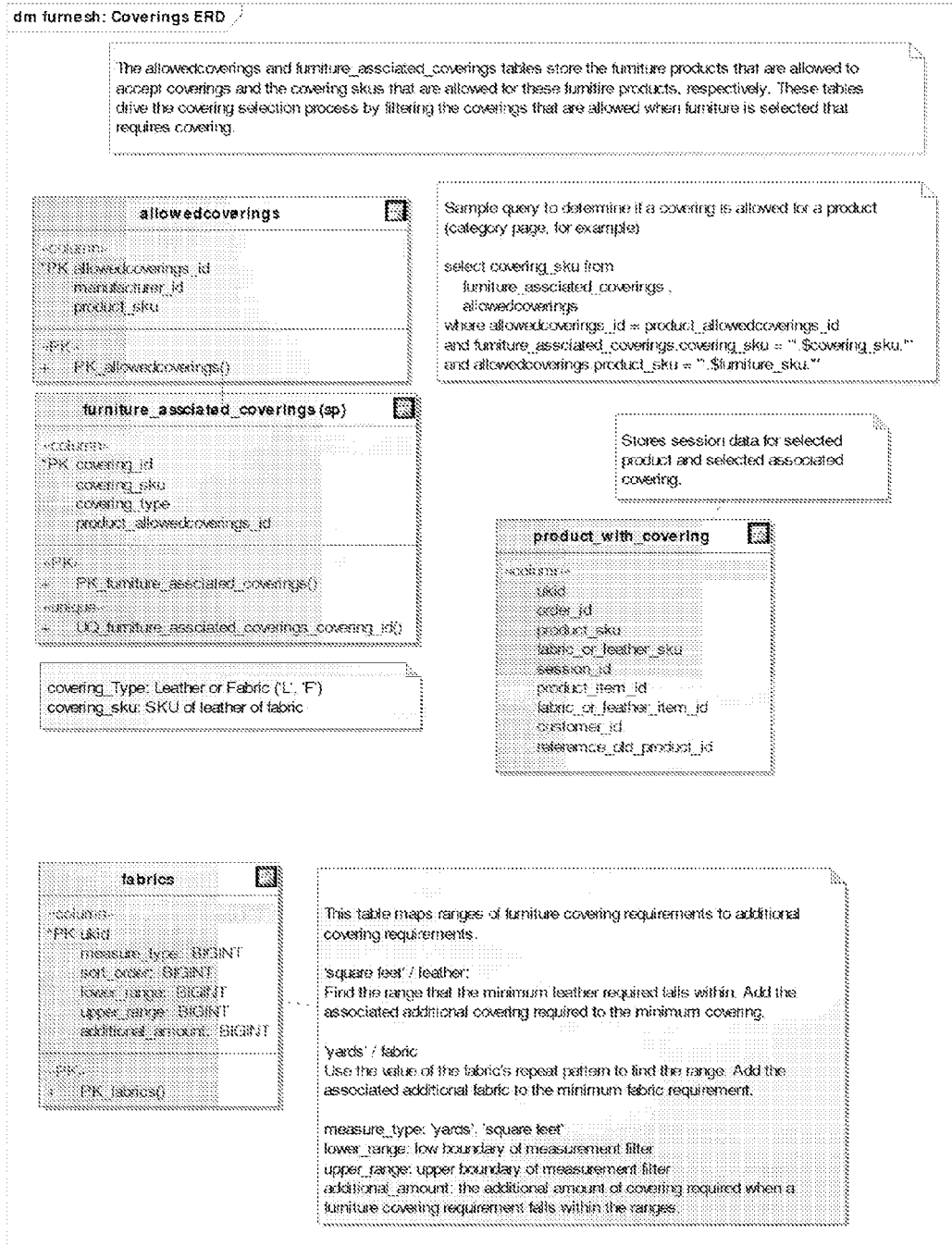
FIG. 3 is a schematic of a table map of the fabric selection process.

As mentioned above, an embodiment of the present invention provides a display showing the total amount of fabric required for upholstering the selected furniture. Accordingly, the program described herein determines the minimum and maximum amount of fabrics required for the selected furniture. A query is sent to the product database to obtain a base amount of the fabric needed for the selected furniture. Such data can be obtained from "fabric_required" datafield of the product database. Further, another query is generated to obtain additional amount of the fabric, which can vary depending on the pattern repeat size of the fabric. The program described herein builds an array of all potential fabric requirements based on repeat ranges of the "fabrics" table shown in FIG. 3. FIG. 3 is a schematic showing, in an embodiment, 4 tables used in the present invention. Each physical table lists a table name, column identifiers, and in certain cases table indexes. The "fabrics" table shown in FIG. 3 maps ranges of furniture covering characteristics to additional covering amounts. The "fabrics" table in FIG. 3 comprises information for each coverings available for the selected furniture piece. Data elements in the "fabrics" table include, for example, "ukid", "measure_type", "sort_order", "lower_range", "upper_range", and "additional_amount". In this exemplary table, the "ukid" is the primary key of the table. The "measure_type" can be either "yards" or "square feet". The "lower_range" denotes low boundary of measurement filter, and the "upper_range" denotes the upper boundary of measurement filter. The "additional_amount" contains the value reflecting the additional amount of covering required when the selected covering's characteristics (e.g., pattern repeat size, hide inconsistency) falls within the specified ranges. In aspect, the largest "additional_amount" contained in the "fabrics" table is added to the value of "fabric_required" to obtain the total amount of covering required to upholster the selected furniture (e.g., "$maxCovering"). Using this approach, ranges of potential covering requirements, of both fabric as well as leather, can be generated for the selected furniture. In some embodiments, the pattern repeat size ranges and the amount of fabric/leather required to upholster the selected furniture can be provided on the display.

Upholstery Calculation:

The amount of a covering chosen for the selected fabric is calculated by the methods of the present invention. If the furniture selected by the customer is a customizable one, it will have a minimum amount of fabric and/or leather specified as part of the data element for that furniture piece. For example, in FIG. 1, the datafields referred to as "fabric_required" and "leather_required" include these product attributes. Additionally, for fabric coverings, the repeat pattern of a piece of fabric will be added to the amount required to cover the selected furniture piece. Similarly, extra amount of leather can be required, depending on the hide inconsistencies of the leather covering. In addition to calculating the total amount of covering needed to cover for the selected furniture piece, the program described herein calculates the range of covering needed based on the repeat pattern, hide inconsistencies and/or any other characteristics of covering materials. Furthermore, the program is also configured to calculate the cost of the selected covering (e.g. total cost as well as cost per unit of measure).

For fabric coverings, the larger the size pattern repeat, the more fabric is needed. For each fabric having pattern repeats, the size of the pattern repeat is stored in the database. For example the size of the repeat may be 7 inches of the "Asteroid" fabric. One can refer to the data element "textile_repeat" (e.g., the size of the pattern repeat) associated with "Asteroid" in the exemplary database shown in FIG. 1. The program calculates the amount of fabric needed based on the amount of fabric needed by the furniture, rounded up to the nearest whole number, plus the additional amount needed based on the size of a repeat of the chosen fabric. The additional amount of fabric needed based on the repeat size and number of repeats is calculated/determined based on the fabric's pattern repeat size in accordance with the repeat ranges, values saved in the database. In an embodiment, the repeat range can be defined by the administrator in the "Coverage Ranges table" page within 'Fabric' section of the website's Admin control panel.

For fabrics, each furniture manufacturer has their own formula (e.g., repeat range) for determining the additional amount of fabric that is needed based on the pattern repeat and other factors. The methods of the present invention streamline this calculation. Each manufacturer publishes this information in their product price list. In embodiment, the method of the present invention uses a formula that is an average of the formulas of several furniture manufacturers. In determining the additional amount of fabric from the fabric's pattern repeat size, the program can be configured to use a factor, a percentage, a simple value for a predefined repeat range, numerical amount or any other formulas that can perform the calculation to obtain the proper amount of additional fabric needed for the selected furniture. In some embodiments, the program is configured to use certain percentage or factor of the base amount defined for the selected furniture (e.g., minimum amount of fabric required). For example, the program sets the additional amount to be about 0% or a factor of 0 for a pattern repeat size in a range between 0 and about 2 inches. The percentage value and the factor value will be different as the pattern repeat range. For example, the program can set the additional amount required to be about 10% or a factor of 1.1 for a pattern repeat size range between 3 and 10, and about 15% or a factor of 1.15 for a pattern repeat size range between 11 and about 20 inches, about 20% or a factor of 1.2 for a repeat range between 21 and 25 inches, and about 25% or a factor of 1.25 for a repeat range between 26 to 36 inches. When the program is configured to use the percentage, then the percentage can be multiplied by the base amount needed and the product is added to the base amount to get the total amount of fabric needed to upholster the selected piece of furniture. In the case of the factor, the factor is multiplied by the base amount to get the total amount of fabric needed.

In another embodiment, the program can be configured to set the additional amount with a specific numerical amount (e.g., when fabrics bolts have certain widths, such as those that are 54" wide). For example, the program can be configured to adds 0 yards to the base amount for fabrics with a 0" to 2" pattern repeat, adds 1 yard for fabrics with a 3" to 10" pattern repeat, adds 2 yards for fabrics with a 11" to 20" pattern repeat, adds 3 yards for fabrics with a 21" to 25" pattern repeat and adds 4 yards for fabrics with a 26" to 36" pattern repeat. Such formula can be defined and modified by the administrator, via the administration screen. The calculations described herein are based on fabrics having width of 54", but fabrics with any other width can be used. Also, in some embodiments, the total amount of fabric can be rounded up to the next whole number, because fabrics are usually sold in whole yards.

As described above, another embodiment of the present invention adds extra amount leather to the base amount to account certain characteristics of leather material. The program can be configured to calculate the total amount of leather required for the selected furniture by adding the base amount and the additional amount determined from the characteristics of the leather, such as hide inconsistency. In an embodiment, for leather materials, the program can be configured to determine the additional amount based on the hide inconsistencies of the selected leather. The program can be configured to retrieve an amount of leather needed and the unit of measurement (e.g., square feet), which corresponds to the datafield referred to as "leather_required" in FIG. 1. The program of the present invention builds an array of all leather requirements based on hide inconsistency ranges, which are stored in, for example, the "fabrics" table shown in FIG. 3. The program obtains ranges with matching unit measure (e.g., "measure_type" of "square feet"), and obtains additional amounts corresponding with the range to determine that the additional amount for that range. Formula based approach, similar to the methods described above for fabric material, can be used for leather.

In an embodiment, the program adds about 5 square feet for every 50 square feet of leather required to upholster the selected furniture piece. According to this formula, about 0-49 square feet of covering needed to upholster the selected furniture piece adds 5 extra square feet, for about 50-99 square feet adds 10 extra square feet, and for about 100-149 adds 15 extra square feet and so on. Since 90 square feet is needed to cover the lounge chair, 10 square feet is added to the amount of covering needed by the selected furniture piece, and the software calculates 100 square feet of leather. In another embodiment, the program can be configured to add an amount of leather in a range from about 1 to about 10 square feet for every 50 square feet of required leather.

In one example, the customer's selected furniture "B.4 Baron 1516" requires 30 square feet of leather for minimum (e.g., base amount). In this example, however, 35 square feet is being added to the cart. Using the embodiment described above, the base amount of this furniture (e.g., 30 square feet) falls between the range 0 to 50 square feet. Accordingly 5 square feet of leather was added to the base amount 30 square feet, resulting total of 35 square feet.

The display further shows the total price for the selected leather. The total price for covering is obtained by multiplying the total amount determined above with unit price of the selected covering. In this example, the unit price of selected leather "Finesse" is $9.75, and it was multiplied by 35 (e.g., total amount required). The total price for the selected leather totals for $341.25. As will be discussed further in detail below, in an embodiment, the program described herein can be configured to provide a display presenting additional information relating to the selected furniture and the covering as well as any additional sub-options relating to the selected covering (e.g., color choices). The software of the present invention provides an output that gives the range of fabric needed for the selected furniture piece, the required amount of covering needed for the furniture piece, and the cost of the covering.

For example, the Bernhardt Zenith lounge chair takes 5.2 yards of fabric. The system rounds up the amount of fabric needed for the chair to the whole yard, so 5.2 yards is rounded up to 6 yards. This value is stored as a datapoint in a table. Fabrics that are available to the user are entered into the database with their repeat pattern size. The methods of the present invention automatically calculate the amount of fabric needed based on piece of furniture and the fabric selected.

In the case of a solid pattern that has no repeat, in this example, 6 yards is sufficient to upholster the chosen chair. However, if the fabric chosen has a pattern with a certain repeat size, then the additional amount of fabric is calculated, as described herein. In this example, the repeat size is between 2 and 10 yards and so an additional 1 yard of fabric is needed which provides a total of 7 yards is needed to upholster the chair. Similarly, a pattern with a 11-20" repeat size requires an additional 2 yards of fabric totaling 8 yards; a pattern with a 21-25" repeat size requires 3 additional yards, a total of 8 yards, and a pattern repeat size of 26"-36" inches needs 4 additional yards thereby calculating a total of 9 yards for the selected furniture piece. In this example, depending on the repeat size of the pattern of the fabric, 6 to 9 yards of fabric are needed to upholster the chair. The methods of the present invention will provide a display showing the range of 6 to 9 yards to the user in the fabric selection process of the furniture purchase. The software also calculates the cost of the fabric. In this example, Bernhardt grade F fabric sells for $48 per yard and has a 6" repeat. With a 6" repeat total 7 yards is needed for the selected chair and the fabric cost totals $336. Accordingly, the methods of the present invention also relate to calculating and displaying the cost of the fabric based on the total amount of fabric needed which is adjusted based on the fabrics repeat size. With any information that is provided in an output display, any indicia thereof can be provided and includes (e.g., text, pictures, symbols and the like).

In an example in which leather is chosen as the covering, the Bernhardt Zenith lounge chair takes 90 square feet of leather. As described herein, the methods of the present invention include adding extra leather to the required amount needed for the selected furniture piece, in order to account for inconsistencies in the hides. In an embodiment, an additional 5 square feet of leather is added for every 50 square feet needed to cover the chair. According to this formula, about 0-49 square feet of covering needed to upholster the selected furniture piece adds 5 extra square feet, for about 50-99 square feet adds 10 extra square feet, and for about 100-149 adds 15 extra square feet and so on. Since 90 square feet is needed to cover the lounge chair, 10 square feet is added to the amount of covering needed by the selected furniture piece, and the software calculates 100 square feet of leather. In an example, Bernhardt grade U leather sells for $10 per square foot and so the leather cost totals $1000, an amount that is provided to the user along with the total required amount needed.

From the product database (FIG. 1), the methods of the invention determine the total amount of fabric required by adding the minimum amount of material required for the selected piece of furniture (e.g., datafield called "fabric_required" of the selected furniture piece) to the value for the additional amount of fabric (e.g., "fabrics.additional_amount" datafield) based on the repeat size of the selected fabric (e.g., "textile_repeat" datafield for selected fabric). The system of the present invention then displays the total required fabric for each potential size repeat range. In an embodiment, fabric requirements are displayed for all repeat ranges defined in the system, and can be done in cases in which fabric falls within a defined repeat range that is or is not available.

The methods of the present invention display the total amount of fabric required and calculate the total fabric price for a selected base furniture product and selected covering. The present invention includes a database in which the range of the repeat size, the unit of measure, and the total amount of fabric needed based on the recited range is stored. The methods include displaying the repeat size range, unit of measure, along with the total fabric needed for the selected piece.

Accordingly, the methods include retrieving repeat size range, the unit of measurement that corresponds with the selected fabric, and the additional amount of fabric needed based on the repeat size, and returning and displaying the information (e.g., providing an indicia of the datapoints). The system adds the additional fabric requirement to the selected furniture piece (e.g., fabric_required datafield) to determine the total fabric requirement (rounding up to the nearest integer). The datafield for the width of the fabric, the fabric size repeat range, the amount of fabric need, the additional amount of fabric needed based on the repeat size, and the unit of measure is referred to in an embodiment as "fabric_dimensions", "textile_repeat", "fabric_required", "Additional Amount" and "fabric_measure_type," respectively. The data for the fabric pattern repeat is defined by datafields "Lower Range" and "Upper Range", and add additional fabric based on the value listed in datafield "Additional Amount". The system determines the total price for fabric by multiplying the unit price by the total fabric required. The system displays the total fabric required and total price.

For each fabric pattern in the product database (FIG. 1) there is one row for the item with the 'Type' value set to configurable and then one row for each colorway for the item with the 'Type' value set to simple. For example, the simple rows are connected to the configurable row in the listings of the "Associated" field in column CG. In the case in which the fabric is defined as a configurable product with different color options as simple associated products, only the repeat value of the base configurable product is used. Repeat values of associated simple products are ignored.

The methods of the present invention include providing a display that includes information or indicia described herein. In a particular embodiment, this feature displays the ranges of a fabric repeat size and the amount of fabric needed for the selected furniture piece. The system retrieves all possible fabric ranges (of type 'yards') from the fabrics table.

The methods further include displaying an amount of leather needed and the total price for selected furniture piece and the selected covering. In particular, this feature of the present invention displays the total amount of leather required for the selected furniture piece and calculates the total leather price for the selected covering. The methods of the present invention retrieve an amount of leather covering needed and the unit of measurement (e.g., square feet) which corresponds to the datafield referred to as "leather_required" in FIG. 1. The method then rounds up to the nearest integer and adds the additional leather requirement based on the amount of covering needed by the selected furniture piece. As described herein, in an embodiment, about 5 square feet is added for about every 50 square feet needed. However, other additional amounts can be added. For example, a range of about 1 to about 10 square feet can be added for about every 50 square feet. Alternatively, about 5 square feet can be added for about every 30 to about 70 square feet, as desired by the administrator. The additional amount is then added to the amount of covering needed to cover the selected furniture piece to arrive at a total. The methods then determine the total price for covering by multiplying the unit price by the total leather required. The system provides a display with indicia of the total leather required and/or total price.

After a user chooses the selected piece of furniture, the user goes to a page similar to that. During this process, certain session variables are set in the session and information is carried on to the next page until the user puts the items in the cart. Certain parameters or session variables include, in an embodiment, the choice of covering. In this case, the choice is either leather or fabric. The datafield of this choice is referred to as "furniture_covering" in FIG. 1. Another session variable/parameter that is maintained during the session is the minimum amount of fabric or leather needed by the selected furniture piece before adjustment of the total amount based on repeat size. For example, this datapoint is found in the datafield referred to as "fabric_required" or "leather_required" in FIG. 1.

Once the user selects the specific covering, the values in the two session parameters are used along with the additional amount of fabric needed based on the repeat size. One example of this datafield is referred to herein as "textile_repeat" which is the size of pattern in inches, so a fabric with a pattern repeat of 7 has a pattern that repeats itself every 7 inches vertically and every 7 inches horizontally.

TABLE 1 covering_ranges table:

| measure_type | upper_range | lower_range | additional_amount |
|---|---|---|---|
| Yards | 2 | 0 | 0 |
| Yards | 10 | 2 | 1 |
| Yards | 20 | 11 | 2 |
| Square feet | 49 | 0 | 5 |
| Square feet | 99 | 50 | 10 |
| Square feet | 149 | 100 | 15 |
| Yards | 25 | 21 | 3 |
| Yards | 36 | 26 | 4 |
| Square feet | 200 | 150 | 20 |
| Square feet | 300 | 201 | 30 |

Using Table 1, a user selects a chair and chooses leather. Referring to FIG. 1, the chair has an amount of "leather_required" of '110' and the leather has a "fabric_measure_type" of 'square feet' which means that the system will add 110 square feet of the selected leather for this chair. The amount of leather needed is calculated by the software when the leather choice is made required because leather is not dependant on a repeat pattern. The methods of the present invention find a match for the unit measure (e.g., fabric measure type of "square feet"), and determines what range the amount of leather needed to cover the selected furniture, and determines that the additional amount for that range. Specifically, in an example in which there is a value of 110 "square feet", the value falls in the range of between 100 and 149 square feet. This record has an additional amount of 15, so the total required leather for this chair is 125 square feet.

Similarly, referring to Table 1, a user selects a chair and chooses fabric. The chair has a "fabric_measure_type" of 'yards' and "fabric_required" of 4. Once the user chooses a specific fabric selection and color, the software can now obtain or retrieve the "textile_repeat" value from the Table shown in FIG. 1. Referring to Table 1 above, in the records for 'yards', the software determines that amount falls within the ranges of the 2nd record. This record has a value for an additional amount of fabric of 1, so a total amount of fabric needed to cover the chair and account for a repeat pattern of the chosen fabric is 5 yards. FIG. 4 is a flow sequence diagrams showing the steps described herein.

Freight Calculation

The methods and system of the present invention include calculating the total amount of shipping charge and presenting the customer with a display showing the freight charge associated with the order (e.g., the cost for shipping for the customized furniture piece). Here, the customized furniture piece refers to the selected furniture piece having the selected covering as described herein. The methods of the present invention also request that the user indicates the preferred shipping method for each piece of customized furniture being purchased. The user's choice can be shown along with the furniture piece. When the user chooses the shipping method (e.g., "shipping_method" datafield), the value is saved in a table, database or array e.g., as the "sales_order_varchar" datafield (this is a standard session table datafield). In cases in which customers will not have the ability to choose shipping methods, the function can be disabled. A shipping method will be assigned to each product. The shipping method assigned for the items will be displayed per item on the "Shopping Cart" page. The total shipping charge will show during the checkout process.

The methods of the present invention further include displaying the freight cost associated with the order. The freight costs can be provided as a total, or a listing of each costs along with the total. In the case of one-step checkout, this section can be disabled or removed. In an embodiment of the present invention, the total shipping charge include, for example, one or more of the following charges: trip cost, per item cost, manufacture shipping cost, manufacturer surcharge, site condition cost, shipping method, or a combination thereof.

In cases in which customers will not have the ability to choose shipping methods, the function can be disabled. In this case, a shipping method will be assigned to each product. This shipping method will display on the cart page per product. The freight charges will show during the checkout process. An embodiment of the program of the present invention performs a function that obtains, e.g., the following parameters: "manufacturer_name" (e.g., name of manufacturer on the order), "sku" (e.g., array of sku's on the order), "state" (e.g., state from the shipping address) and "site_conditions" (e.g., array of site condition survey question id's and associated answers). The program of the present invention can be configured to add one or more of freight cost factors and returns the total shipping charge for an order, which will be set in the shipping amount for the order. In an embodiment, the total shipping charge is the sum of the following values: trip cost (e.g., "trip_cost" table), the sum of the per item costs (e.g., "order_charge" value for each item in the sku parameter array), the manufacturer cost (e.g., the "shipping_cost" from the "manufacturer_state_freight" table using the state parameter value and the "manufacturer_ukid" value, which is obtained by matching the "manufacturer_name" value), the manufacturer surcharge (e.g., value from the manufacturer table by matching the "manufacturer_name"), and the site condition cost (e.g., the sum of the values from the "site_condition" table for each question in which the "site_conditions" value is set to "Y"). The sum of these costs result in the total shipping charge for the freight.

As mentioned above, the total shipping charge can include a trip cost, in which each order has a flat freight charge. In an example, the flat freight charge is $100. The total freight cost calculation can also include a "per item cost" in which each customized furniture piece has its own specific freight charge. For example, the "per item" cost for shipping a table is $50, and a chair is $25. If the user orders 1 table and 2 chairs, the freight charge of $100 is added to the total cost at checkout.

Yet another freight calculation cost includes the "manufacturer freight cost." Manufacturers charge for shipping the items. This charge can vary depending on the manufacturer and/or and the state to which the customized furniture is being shipped (e.g., distance to destination). In an embodiment, if the table and chairs are going to Texas and the table comes from one manufacturer and the chairs from another, the program retrieves data from a table to determine the cost for each. For example, the table manufacturer charges $25 to ship to Texas and the chair manufacturer charges $50 to ship to Texas. These manufacturer freight cost totaling $75 is added to the total freight calculation.

Yet another freight cost factor that can be included in the freight calculation is a "manufacturer surcharge cost." Certain manufacturers charge for preparing the customized furniture to ship, e.g., such as packing. If the freight calculation table has a data element for such a charge, then the corresponding data value is added to the total freight calculation. In an example, a manufacturer charges $10 for packing.

Yet another freight cost factor relates to the "site conditions" can be considered in calculating the total freight cost. The site condition charges vary depending on the conditions of the destination site, which would likely to make the delivery difficult or time consuming. Many conditions can be considered. In an embodiment, the program described herein can be configured to present to the customer a questionnaire which is designed to assess the site conditions. For example, the questionnaire can ask "Is there more than 1 flight of stair?" and "Is the building a union regulated building. Each condition can be assigned with a predetermined charge, and the total site condition charge can be obtained based on the responses received from the customer. In an embodiment, any combination of one or more of the freight costs factors can be used to determine the total freight shipping cost. In another embodiment, every freight cost factors described above can be added up to determine the total freight cost amount.

In an embodiment, the site survey questionnaire is presented immediately after the customer enters shipping information entry section. This section/page can be entitled, for example, 'Site Questionnaire' or any other similar titles. When the customer answers the questions, the values are stored in a database, a session array, or a session table. For example, the program of the present invention provides a display having questions for the customer to answer, and the program returns the values of the received answers to determine the site condition charge. In an embodiment, the program obtains questions from the "site_condition" table, and presents a display configured to obtain answers from the customer (e.g., Yes/No radio buttons after each question). The answers of the customer can be captured as session variables or session array for later use. In an embodiment of the present invention, presenting the "Site Questionnaire" and obtaining the answers from the customer can be mandatory.

Any information about the site condition can be requested from the user and an appropriate amount can be attached to the site condition, as desired.

In an embodiment, each of these freight costs is added up to determine the total amount. In another embodiment, one or any combination of these freight costs can be used to determine the shipping amount. In the example provided above, if all freight costs are added, and the user indicated that "yes" to more than 1 flight of stairs (which is a $5 charge), then the total freight charge would be $290.

The methods of the present invention further include displaying the freight cost associated with the order. The freight costs can be provided as a total, or a listing of each costs along with the total. In the case of one-step checkout, this section can be disabled or removed.

The program of the present invention also includes an administrative functionality to administer and maintain the database and tables used in determining the freight calculation. The program described herein allows the administrator to create, delete and edit tables and data element values, and manage the relationship between data elements/tables. For example, the administrator can maintain and administer the "trip_cost" table. In an aspect, the program can present a display configured to illustrate table in a graphical form, and enable the administrator to easily enter data or update the values. A top menu option called 'Freight' with a sub-option called 'Trip Cost' was created to so that the trip cost table can be maintained. Additionally, similar functionality can be created to maintain the "manufacturer" and "manufacturer_state_freight" tables. A sub-option called 'Manufacturer Info' was created and added under the top menu option called "Freight."

The software can include a screen listing of the records in the manufacturer table. The methods of the software, using the screen, allows for creation, deletion and editing of records in the table. Another tab, such as the "General Info" allows the administrator to add, edit or delete information in the manufacturer table. Similarly, another tab can be used to administer information in the "manufacturer_state_freight" table. Screens allow functionality to add or edit records in which general information and state information about the manufacturer can be inputted and maintained. The methods of the invention allow one to click on the link to allow one to add questions, set the sort order and associated dollar amounts.

System

In aspect, the present invention also relates to a computer system or a server system to carry out the methods described herein. Referring to FIG. 5 one embodiment of a server system 100 that implements the methods described above includes one or more processors 102, one or more databases 104, one or more network or other communication interfaces 106, a memory 108, and one or more communication buses 110 for interconnecting these components. The server system 100 may optionally include a user interface 112 comprising an output device (e.g., for providing screens to administrator to manage the database) and/or an input device (e.g., for administrator to enter commands and data values). An "output device" is defined as a medium for communicating the information described herein and includes e.g., printouts, monitors showing screen outputs on computers or hand held/mobile devices, email output, and the like. Output devices include any device that allows for access to the information described herein or an administration tool. An "input device" is defined as a medium for communicating the information described herein and includes e.g., keyboard, mouse, touch screen, and the like. Input devices include any device that allows entering information/data described herein. Input and Output devices include those that are known in the art and those that are later developed.

The memory 108 can include high speed random access memory and can also include non-volatile memory, such as one or more magnetic or optical storage disks. In an embodiment, the memory can be a mass storage that is remotely located from the processor of the server system. The memory 108 can store, for example, the following elements: an operating system that includes procedures for handling various basic system services and for performing hardware dependent tasks; a network communication module (or software instructions) that is used for connecting the server system 110 other computers (e.g., customer's client system—not shown) via the one or more communication network interfaces 106 and communication networks such as the Internet, other wide area networks, local area networks, metropolitan area networks, and the like; and the program configured to carry out various functions described above.

The server system 100 employs one or more processors 102 in which the operation of programs or instructions is executed. A processor 102 can have one or more processor "cores" to carry out functions, methods, and routines of instructions in accordance with the present invention described above. The program referred in here can comprise any set of instructions to be executed directly (such as machine code) or indirectly (such as scripts) by the processor(s). In that regard, the terms "codes," "programs," "applications," "instructions," and "routines" may be used interchangeably herein. The programs can be implemented in any computer language (e.g., PHP, Perl, C, C++, Java, or other suitable programming language) or format such as in object code or modules of source code. Although the product database 104 is illustrated as a discrete component of the system 100 in FIG. 5, in some other embodiments, the product database 104 can be implemented in the memory 108 along with other programs and systems stored therein. Further, although the processor 102, the database 104, and the memory 108 are functionally illustrated in FIG. 5 as being within the same system 110, in some embodiments, the processor 102, the database 104, and the memory 108 can be located discretely in different systems.

Throughout carrying out the functions and routines of the present invention, many data are retrieved, generated, stored, or modified by the processor in accordance with the instructions. As mentioned earlier, the data can be stored as a collection of data. For instance, although the invention is not limited by any particular data structure, the data can be stored in computer registers, in a relational database as a table having a plurality of different fields and records, in a web page cache, as XML documents, or as flat files. In accordance with aspects of the present invention, the data can comprise electronic contents such as web pages. Furthermore, a given web page can comprise one or more files, a dataset stored in a database, a web cache, and the like.

In operation, the user accesses the server system 100 using the client's computer system (not shown). The connection between the server system 100 and the client computer system can be achieved via the Internet or any other communication networks described above. The client computer system can be any number of devices including a computer, a mobile phone, or similar devices, or a network made up of such devices. The client system include any device that enable the customer to access the server system and interact with the programs therein, as appropriate. In an embodiment, the customer uses any commonly known web-browser (e.g., Microsoft Internet Explorer, Mozilla Firefox, Apple Safari) to access the server system 100. Furthermore, in other embodiments, a display containing the information described herein can be downloaded to a computer, mobile phone, PDA or other device to view the generated output described herein.

Upon accessing the server system 100, the customer is provided with predefined initial contents. In an embodiment, the initial page can display a plurality of products. The customer may be presented with many different categories of products, including the upholsteries. Although the customer can browse through the entire covering products initially, in some embodiments, the covering type or at least some covering products can be suppressed from the display if none of the coverings are associated with the selected furniture piece. On this exemplary screen, the customer can sort the furniture by type, style, manufacture, and like.

When the customer selects certain criteria (e.g., "Lounge" type), the program queries the product database 104 for list of "Lounge" type products and their corresponding images, to present a display to the customer. As shown in FIG. 5, the product database 104 can be directly coupled to the server system 100 in an embodiment of the present invention. In an alternative embodiment, the product database 104 can be a standalone system or coupled to another computer system. Furthermore, the customer's product type selection can be stored in a session variable/data, a session array, a session table, or in any other appropriate format to be used in the method and/or functions described herein. Some contents and data can be stored on the client system, such as in cache memory.

Next, the customer selects a desired furniture piece from the displayed products, the program queries the product database for information relevant to the selected furniture as well as the image to be presented on a display. In this exemplary display, the selected furniture's COM/COL prices are shown. The selected furniture is a customizable one, and the display comprises drop down selection box for "Upholstery Type" and "Finish," in which both of those selections are indicated as required for the selected furniture. The customer selects a desired covering type (e.g., fabric or leather) as well as finish type. In an embodiment, a separate session is created during each furniture customization process (e.g., selection of furniture and covering for the selected furniture). In this example, the session contains a session data indicating that the session is in "Covering Selection Mode," meaning that the customer has selected a furniture piece that requires a covering selection. The customer's selections for furniture, covering type, and the finish type can be stored in session variables/data, a session array, a session table, or in any other appropriate format to be used in the method and/or functions described herein.

In an embodiment, two tables (e.g., "allowedcoverings" and "furniture_associated_coverings" shown in FIG. 3) are used as a relational database to obtain the available fabrics. These two tables store the furniture products that are allowed to accept coverings and the covering SKUs that are allowed for these furniture products, respectively. These tables drive the covering selection process by filtering the coverings that are allowed when the selected furniture requires covering. Here, the program again queries the product database for coverings available for the selected piece of furniture within the selected covering type as well as their images, and available fabric choices are presented in the display of the client system.

As discussed above, the program can also be configured to present the minimum and the maximum amount of covering required for the selected furniture. The program obtains the range of total amount of covering requirement based on the product requirement and the characteristics of the upholsteries (e.g., pattern repeat size/hide inconsistency). The characteristics of the available upholsteries are stored in the product database. For example, the pattern repeat sizes of available fabrics for the selected furniture are recorded in the database with their repeat pattern size (e.g., "textile_repeat"). As described above, the "fabrics" table shown in FIG. 3 can be utilized to obtain the minimum and the maximum amount of potential covering requirements for the selected furniture. The "fabrics" table contains a plurality of ranges for determining the additional amount of covering for given covering type. Table 1, described herein, is an exemplary illustration of the "fabric" table and covering ranges used in presenting the minimum/maximum amount of covering for the selected furniture "Atlantic 6262."

Accordingly, in an embodiment, the program is configured build an array of all potential fabric requirements based on repeat ranges in "fabric" table. As explained above, the total amount of fabric required for the selected furniture is obtained by adding the base amount of required (e.g., datafield called "fabric_required" of the selected furniture piece) and the additional amount of fabric (e.g., "fabrics.additional_amount" datafield), which is based on the repeat size of the selected fabric (e.g., "textile_repeat" datafield for selected fabric). The program adds the determined additional amount of fabric to the base amount of fabric for the selected furniture piece (e.g., fabric_required datafield) to determine the total fabric requirement (which is rounded up to the nearest whole number). The datafield for the dimension of the fabric, the fabric size repeat range, the amount of fabric need, the additional amount of fabric needed based on the repeat size, and the unit of measure are referred to, in an embodiment, as "fabric_dimensions", "textile_repeat", "fabric_required", "additional_amount" and "fabric_measure_type," respectively. The pattern repeat range for each fabric available for the selected furniture is defined by datafields "lower_range" and "upper_range" of the "fabrics" table as shown in the exemplary table 1 above. The additional fabric for each corresponding range is listed in datafield "additional_amount".

In one example, the selected furniture "Atlantic 6262" requires total fabric in a range of 7 to 13 yards. This range is calculated from the plurality of pattern repeat size ranges from the "fabric" table. In this example, the customer selected fabric in the covering selection page, and the customer's selection was stored as a session variable. Therefore, in an embodiment, the program will only consider ranges relevant to fabric, which can be identified from "measure_type" value with "yards." As shown in table 1 above, the repeat size between 0 and 2 inches does not require any additional amount of fabric. In such case, the base amount, 7 yards of fabric, is needed to upholster the furniture. A good example of such case is a solid color fabric, and the base amount specified for the selected furniture will be sufficient to upholster the furniture. Next pattern repeat range is between 2 inches and 10 inches, requiring 1 additional yard of fabric. There are total of 5 ranges for "Atlantic 6262" in which the highest pattern repeat range is between 26 inches to 36 inches, requiring 6 yards of additional fabric. Accordingly, the minimum amount of fabric required for "Atlantic 6262" is 7 yards, which is the base amount. The maximum amount of fabric needed for "Atlantic 6262" is 13 yards. In an embodiment, the total amount of fabric needed for the furniture is calculated for every single range available in the fabric table, and the total amounts are displayed along with the corresponding ranges. In other embodiment, the program can be configured to use the base amount as the minimum amount and obtain the largest "additional_amount" value to generate the maximum amount needed to upholster the selected furniture.

Upon receiving a selection for a fabric, the program queries the product database for any sub-options available for the selected fabric, such as color options. As discussed above, for each product selection, there is one row for the item with the "Type" value set to configurable and one or more rows for each colorway for the item with the "Type" value set to simple in the product database (FIG. 1). For example, the simple rows are referenced to the configurable row in the listings of the "Associated" field in column CG. In the case in which the fabric is defined as a configurable product with different color options as simple associated products, only the repeat value of the base configurable product is used. Repeat values of associated simple products are ignored.

In an embodiment, the display comprises the total required amount of fabric and total price of the fabric. Accordingly, in an aspect, the present invention is also related to calculating and displaying the total cost of the fabric which is adjusted based on the fabric's pattern repeat size. The program determines the total price for fabric by multiplying the unit price by the total fabric amount required. In this example, the unit price of the selected fabric "Drift" is $76 per yard. Since "Drift" has no pattern, the base amount 7 yards is sufficient to upholster "Atlantic 6262," totaling $532. Other additional information relating to the selected furniture and the fabric, for example, name of the pattern and color, enlarged image of the fabric, can be presented. The customer's color selection can be stored in a session variable/data, a session array, a session table, or in any other appropriate format to be used during the methods described herein.

The checkout page, shows selected furniture with price, selected covering for the selected furniture with amount and price, as well as the total price of the order. The furniture prices and the upholstery price based on the amount needed are separately listed. The calculation of the total price for items in the carts can be carried out by utilizing various session variables/data maintained during the processes described above. For example, the session variables/data reflecting the customer's selection for furniture, finish type, covering, pattern, color, quantities for the furniture and covering, and the like, can be used to calculate the total price or obtain additional data necessary for calculating the total price this order. Other session variables/data, such as "order_id," "session_id," "customer_id," and the like, can be utilized to verify the items in the cart for the customer. In an embodiment, upon receiving the purchase confirmation from the customer, the server system 100 issues purchase order to the upholstery supplier and order the upholstery to be shipped to the furniture manufacturer. Similarly, the server system 100 issues a purchase order to the furniture manufacturer, provides information as to the upholstery order, and orders the customer's selected furniture to be shipped to the customer. In an embodiment, the program can be configured to provide post order/acknowledgement, such as lead time information for both furniture and upholstery, to the customer.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a computer system, a method for ordering customized furniture, the method comprises:
 a) receiving a selection for a piece of furniture to be upholstered, wherein the selected furniture piece requires a covering and has a base amount for the required covering, to thereby obtain a selected furniture piece;
 b) receiving a selection for a covering, wherein the selection is made from one or more coverings associated with the selected furniture piece, wherein the covering is associated to a fabric material having a fabric repeat size between 0 to 36 inches, to thereby obtain a selected covering;
 c) determining, using at least one computer processor, a total amount of selected covering needed to upholster the selected furniture piece, wherein the total amount of selected covering is determined based on an additional covering amount related to the fabric repeat size of the fabric material, and the base amount of the required covering, the step of determining further comprising the step of calculating the additional covering amount based on the fabric repeat size, comprising:
  calculating the additional covering amount to be about 0% of the base amount for a fabric having a repeat size in a range between 0 and about 2 inches;
  calculating the additional covering amount to be about 10% of the base amount for a fabric having a repeat size in the range of between 3 and 10 inches;

calculating the additional covering amount to be about 15% of the base amount for a fabric having a repeat size in the range of about 11 to about 20 inches;
calculating the additional covering amount to be about 20% of the base amount for a fabric having a repeat size in the range of between 21 and 25 inches; and;
calculating the additional covering amount to be about 25% of the base amount for a fabric having a repeat size in the range of between 26 and 36 inches; and d) providing a display indicating the the total amount of selected covering needed to upholster the selected furniture piece.

2. The method of claim 1, wherein the display further comprises the selected furniture piece, the selected covering, a price of the selected furniture piece and a separate price of the selected covering.

3. The method of claim 1, wherein the base amount of covering required for the selected furniture piece is rounded up to a next whole number.

4. A non-transitory computer readable medium storing executable instructions which, when executed, cause at least one computer processor to perform the following steps:

a) receiving a selection for a piece of furniture to be upholstered, wherein the selected furniture piece requires a covering and has a base amount for the required covering to thereby obtain a selected furniture piece;

b) receiving a selection for a covering associated with the selected furniture piece, wherein the covering relates to one or more fabric materials each having a fabric repeat size, to thereby obtain a selected covering;

c) determining a total amount of selected covering needed to upholster the selected furniture piece, wherein the total amount of selected covering is determined by adding an additional covering amount and the base amount of the required covering, the step of determining the total amount of selected covering further comprising the step of calculating the additional covering amount based on the fabric repeat size, comprising:
calculating the additional covering amount to be about 0% of the base amount for a fabric having a repeat size in a range between 0 and about 2 inches;
calculating the additional covering amount to be about 10% of the base amount for a fabric having a repeat size in the range of between 3 and 10 inches;
calculating the additional covering amount to be about 15% of the base amount for a fabric having a repeat size in the range of about 11 to about 20 inches;
calculating the additional covering amount to be about 20% of the base amount for a fabric having a repeat size in the range of between 21 and 25 inches; and;
calculating the additional covering amount to be about 25% of the base amount for a fabric having a repeat size in the range of between 26 and 36 inches; and d) providing a display indicating the additional amount of covering needed.

5. The non-transitory computer readable medium of claim 4, further causing at least one computer processor to perform the step of: providing a display indicating the selected furniture piece, the selected covering, the total amount of selected covering needed to upholster the selected furniture piece, a cost associated with the selected furniture piece, the cost associated with the additional amount of covering needed, and a separate cost associated with the total amount of the selected covering.

6. The method of claim 1, further comprising:
a) determining amounts for two or more freight cost factors for the selected furniture, wherein the freight cost factors include trip cost, per item cost, manufacture shipping cost, manufacturer surcharge, site condition cost, or a combination thereof;
b) determining a freight shipping cost based on two or more freight cost factors, to thereby obtain a freight shipping cost; and
c) providing a display to the user comprising the freight shipping cost.

7. The method of claim 6, wherein the freight shipping cost comprises amounts of five different freight cost factors, wherein the amount of the five freight costs factors are added to thereby obtain a freight shipping cost.

8. The method of claim 7, wherein the methods further include providing a display to the customer comprising the shipping method.

9. The method of claim 6, further comprising:
receiving information about one or more site conditions; and
allocating a predetermined cost for each of the site condition received.

10. A computer system for ordering customized furniture by a user, the computer apparatus comprises:

a) one or more databases for storing information associated with one or more furniture pieces to be upholstered, and information associated with one or more coverings for the furniture pieces wherein the covering is associated to a fabric material having a fabric repeat size or a leather material having a hide inconsistency, wherein the database includes information about a base amount for the required covering, and an additional covering amount related to the fabric repeat size of the fabric material or the hide inconsistency of the leather material;

b) one or more processor coupled to the one or more databases; and c) a memory storing one or more programs to be executed by one or more processors, the one or more programs having instructions for:

i) receiving a selection from the user for a piece of furniture to be upholstered, wherein the selected furniture piece requires a covering and has a base amount for the required covering, to thereby obtain a selected furniture piece;

ii) receiving a selection from the user for a covering associated with the selected furniture piece, wherein the covering is associated to a fabric material having a fabric repeat size, to thereby obtain a selected covering;

iii) determining a total amount of selected covering needed to upholster the selected furniture piece, wherein the total amount of selected covering is determined by adding the base amount of the covering required for the selected furniture piece and an additional covering amount the step of determining further comprising:
calculating the additional covering amount to be about 0% of the base amount for a fabric having a repeat size in a range between 0 and about 2 inches;
calculating the additional covering amount to be about 10% of the base amount for a fabric having a repeat size in the range of between 3 and 10 inches;
calculating the additional covering amount to be about 15% of the base amount for a fabric having a repeat size in the range of about 11 to about 20 inches;

calculating the additional covering amount to be about 20% of the base amount for a fabric having a repeat size in the range of between 21 and 25 inches; and;

calculating the additional covering amount to be about 25% of the base amount for a fabric having a repeat size in the range of between 26 and 36 inches;

and iv) providing to a display to the user, wherein the display comprises the the total amount of selected covering needed to upholster the selected furniture piece.

11. The computer system of claim 10, wherein the display further comprises a price of the selected furniture piece the selected furniture piece, the selected covering, and a price of the selected covering.

12. The computer system of claim 10, wherein the display further comprises the additional amount of covering determined based on the fabric repeat size of the fabric material.

13. The computer system of claim 10, wherein the one or more database store information relating to freight cost factors, wherein the freight cost factors include trip cost, per item cost, manufacture shipping cost, manufacturer surcharge and site condition cost, or a combination thereof, and wherein the one or more programs further include instructions for: determining amounts for two or more freight cost factors for the selected furniture piece; and determining a freight shipping cost based on the amounts determined freight costs factors to thereby obtain a freight shipping cost.

14. The computer system of claim 10, wherein the one or more programs further include instructions for:

receiving information about one or more site conditions from the customer; and allocating a cost for each of the site condition received.

15. The computer system of claim 14, wherein the freight shipping cost is determined based on amounts of five different freight cost factors, wherein the amount of the five freight costs factors are added to thereby obtain a freight shipping cost.

16. The computer system of claim 14, wherein the display to be presented to the customer further comprises a shipping method.

* * * * *